US009272683B2

(12) United States Patent
Anderson et al.

(10) Patent No.: US 9,272,683 B2
(45) Date of Patent: Mar. 1, 2016

(54) DUAL CHAMBERED PASSENGER AIRBAG

(71) Applicant: TK Holdings Inc., Auburn Hills, MI (US)

(72) Inventors: Christopher L. Anderson, Harrison Township, MI (US); Samuel Zeng, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/212,701

(22) Filed: Mar. 14, 2014

(65) Prior Publication Data

US 2014/0265278 A1   Sep. 18, 2014

Related U.S. Application Data

(63) Continuation-in-part of application No. 14/192,812, filed on Feb. 27, 2014.

(60) Provisional application No. 61/785,961, filed on Mar. 14, 2013.

(51) Int. Cl.
*B60R 21/233* (2006.01)
*B60R 21/239* (2006.01)

(52) U.S. Cl.
CPC .............. *B60R 21/233* (2013.01); *B60R 21/239* (2013.01); *B60R 2021/2395* (2013.01); *B60R 2021/23324* (2013.01); *Y10T 29/49826* (2015.01)

(58) Field of Classification Search
CPC ................... B60R 2021/23324; B60R 21/233; B60R 2021/23316

USPC ................................ 280/729, 735, 742, 743.2
See application file for complete search history.

(56) References Cited

U.S. PATENT DOCUMENTS 3,614,129 A     10/1971   Sobkow .................. 280/150 AB
5,160,164 A  *  11/1992   Fischer et al. ............. 280/743.2

(Continued)

FOREIGN PATENT DOCUMENTS

JP       10-100827       4/1998
KR      20040073017      8/2004

OTHER PUBLICATIONS

Federal Motor Vehicle Safety Standards, Nov. 25, 2013.*

(Continued)

*Primary Examiner* — Karen Beck
(74) *Attorney, Agent, or Firm* — L.C. Begin & Associates, PLLC.

(57) ABSTRACT

An airbag 10 includes at least one panel 12 defining an interior 104/102 of the airbag, and a divider 100 positioned in the interior so as to divide the interior into an upper chamber 102 and a lower chamber 104. A valve mechanism 200 is operatively coupled to the divider 100 for restricting a flow of gases from the lower chamber 104 into the upper chamber 102. The valve mechanism 200 includes one or more valves 200 with a desired aggregate opening(s) and located in predetermined location(s) thereby affecting a designed inflation profile. The divider 100 has an arcuate length $L_d$, measured between two divider airbag attachment points 100d and 100a, greater than a corresponding linear horizontal airbag length $L_a$, measured between the same two attachment points. The passenger side airbag 10 for each unique vehicle is designed by iteratively reconciling the requirements of FMVSS208 with the present airbag design.

20 Claims, 16 Drawing Sheets

(56) References Cited

U.S. PATENT DOCUMENTS

| | | | | |
|---|---|---|---|---|
| 5,282,646 | A * | 2/1994 | Melvin et al. | 280/729 |
| 5,586,782 | A * | 12/1996 | Zimmerman, II | B60R 21/23138 280/730.2 |
| 6,213,500 | B1 * | 4/2001 | Jost | B60R 21/201 280/730.2 |
| 6,270,113 | B1 * | 8/2001 | Wipasuramonton | B60R 21/23138 280/728.1 |
| 6,276,716 | B1 * | 8/2001 | Kato | 280/735 |
| 6,663,140 | B1 * | 12/2003 | Heinz | B60R 21/23138 280/728.2 |
| 6,976,702 | B2 * | 12/2005 | Yokota | B60R 21/23138 280/729 |
| 7,357,411 | B2 * | 4/2008 | Kurimoto | B60R 21/23138 280/729 |
| 7,543,850 | B2 | 6/2009 | Bachraty et al. | |
| 8,181,990 | B2 * | 5/2012 | Maripudi | B60R 21/233 280/732 |
| 8,419,050 | B2 * | 4/2013 | Yoo | 280/729 |
| 8,757,656 | B2 * | 6/2014 | Miyata | 280/729 |
| 9,108,588 | B2 * | 8/2015 | Fukawatase | B60R 21/233 |
| 9,114,777 | B2 * | 8/2015 | Fukawatase | B60R 21/232 |
| 2001/0015546 | A1 * | 8/2001 | Kato | B60R 21/233 280/735 |
| 2003/0160433 | A1 * | 8/2003 | Kumagai | B60R 21/233 280/729 |
| 2007/0257473 | A1 * | 11/2007 | Choi | B60R 21/0136 280/735 |
| 2007/0284859 | A1 * | 12/2007 | Kashiwagi | B60R 21/207 280/730.2 |
| 2009/0058056 | A1 * | 3/2009 | Yamada | 280/732 |
| 2009/0152846 | A1 * | 6/2009 | Choi | 280/729 |
| 2012/0025497 | A1 * | 2/2012 | Yoo | 280/729 |
| 2012/0025498 | A1 * | 2/2012 | Tanaka | B60R 21/233 280/730.2 |
| 2014/0246846 | A1 * | 9/2014 | Anderson | B60R 21/233 280/743.2 |
| 2014/0306433 | A1 * | 10/2014 | Anderson et al. | 280/729 |
| 2015/0217716 | A1 * | 8/2015 | Anderson | B60R 21/2338 280/729 |

OTHER PUBLICATIONS

Code of Federal Regulations, Title 49—Transportation, vol. 6, Section 571.208 Occupant Crash Protrection, Oct. 1, 2012.*

U.S. Department of Transportation, National Highwy Traffic Safety Administration, Laboratory Test Procedcure for FMVSS 208, Occupant Crash Protection, Apr. 16, 2008, p. 146-149.*

Narayan et al. Airbag development process using hyperworks automation. Jun. 5, 2012, pp. 14-20.

* cited by examiner

DUAL CHAMBERED PASSENGER AIRBAG

CROSS-REFERENCE TO RELATED APPLICATIONS

This application claims the benefit of U.S. Provisional Application Ser. No. 61/785,961, filed on Mar. 14, 2013, the disclosure of which is incorporated herein by reference in its entirety. This application is also a continuation-in-part of and co-owned U.S. application Ser. No. 14/192,812 having a filing date of Feb. 27, 2014.

BACKGROUND OF THE INVENTION

The present invention relates a passenger airbag, which is filled with gas during an emergency situation such as, for example, a frontal or side impact.

Current airbag cushion designs may include multiple chambers and may incorporate an inter-chamber venting system that allows gas to flow from one chamber to another. These cushions are configured to rapidly contact a vehicle occupant when inflated, to limit movement of the passenger head, neck and thoracic regions. However, these cushion designs do not differentiate between these different regions with regard to the stiffness or resistance of the various portions of the airbag to contact with each region.

Research has shown that the masses of the various body portions contacting an airbag differ greatly. For example, the mass ratio of the Thorax to Head & Neck regions may range from between 5:1 to 8:1, depending on the sex of the individual. Due to the differences in body part masses and the dynamics of contact between the occupant and the cushion, it has proven difficult to design a multi-chamber airbag which provides optimum protection for each portion of the body contacting the airbag.

Thus, a need exists for an airbag design which permits the stiffness or resistance to occupant impact provided by each portion of the airbag to be adjusted according to the time elapsed since the initiation of airbag deployment, the size of the occupant, and/or the masses of different portions of the occupant's body contacting an associated portion of the airbag. Stated another way, a need exists to protect a broad spectrum of occupants as represented by the H (or "Hybrid") anthropomorphic test devices (ATDs) such as the H-III 50$^{th}$ percentile Male anthropomorphic test device (ATD), the H-III 5 percentile Female ATD, and the H-III 3-year old or H-III 6-year old ATD.

SUMMARY OF THE INVENTION

In one aspect of the embodiments described herein, an airbag is provided including at least one panel defining an interior of the airbag, and a divider positioned in the interior so as to divide the interior into an upper chamber and a lower chamber. A valve mechanism is operatively coupled to the divider for restricting a flow of gases from the lower chamber into the upper chamber. The valve mechanism is structured such that an actuation response time of the valve in attenuating or impeding gas flow from the lower chamber into the upper chamber is proportional to the pressure differential between the upper and lower chambers.

In another aspect of the embodiments described herein, an airbag is provided including at least one panel defining a front side of the airbag structured to define a flat plane (P) when the airbag is in an inflated condition.

In another aspect of the embodiments of the described herein, an airbag is provided including at least one panel defining an interior of the airbag and a divider positioned in the interior so as to divide the interior into an upper chamber and a lower chamber. The airbag is structured so as to deploy above a top of a head 700a of a Hybrid III 6-Year Old Anthropomorphic Test Device, as the upper chamber inflates in the initial stage of deployment and when the head is positioned resting against or proximate the vehicle instrument panel at a location specified as Position-2 for Out of Position (OOP) testing in accordance with FMVSS Standard No. 208.

In another aspect of the embodiments described herein, an airbag is provided including at least one panel defining an interior of the airbag and a divider positioned in the interior so as to divide the interior into an upper chamber and a lower chamber. The divider has at least one opening formed therealong, the at least one opening being positioned such that all edges of the at least one opening reside within a zone (Z3) bounded by a first vertical plane (P1) residing a predetermined distance (100f) along the divider from an inflator side (22) of the airbag toward an occupant contact side (20) of the airbag, and a second vertical plane (P2) passing through a location (100j) defined by a distance (D1) along the divider from a seam (110a) connecting the divider (100) with the occupant side (20) of the airbag, after activation of the airbag.

In another aspect of the embodiments of the described herein, an airbag is provided including at least one panel defining an interior of the airbag, and a divider positioned in the interior so as to divide the interior into an upper chamber and a lower chamber. The airbag is structured to provide proportional restraint of a thoracic region of a vehicle occupant after activation of the airbag. In accordance with the present invention, the airbag divider is designed to maximize protection of adult occupants while minimizing the risk to young out-of-position occupants. Accordingly, the effective length of the divider is greater than or equal to at least 105% of the effective length of the airbag, thereby resulting in a desired trajectory upon deployment.

Stated another way, an airbag for an automotive vehicle contains at least one outer panel forming an airbag, the outer panel having an inner wall and the airbag also having a linear length extending toward a rear position of the automotive vehicle when the airbag is fully deployed. The airbag further contains a perforated divider (containing one or more valves or openings) sealed and fixed to the inner wall thereby forming an upper chamber and a lower chamber within the airbag, the divider having an arcuate length extending from the instrument panel toward the rear of the automotive vehicle when the airbag is fully deployed, wherein the arcuate length is at least 5% greater than the linear length.

DETAILED DESCRIPTION

Figure 1:
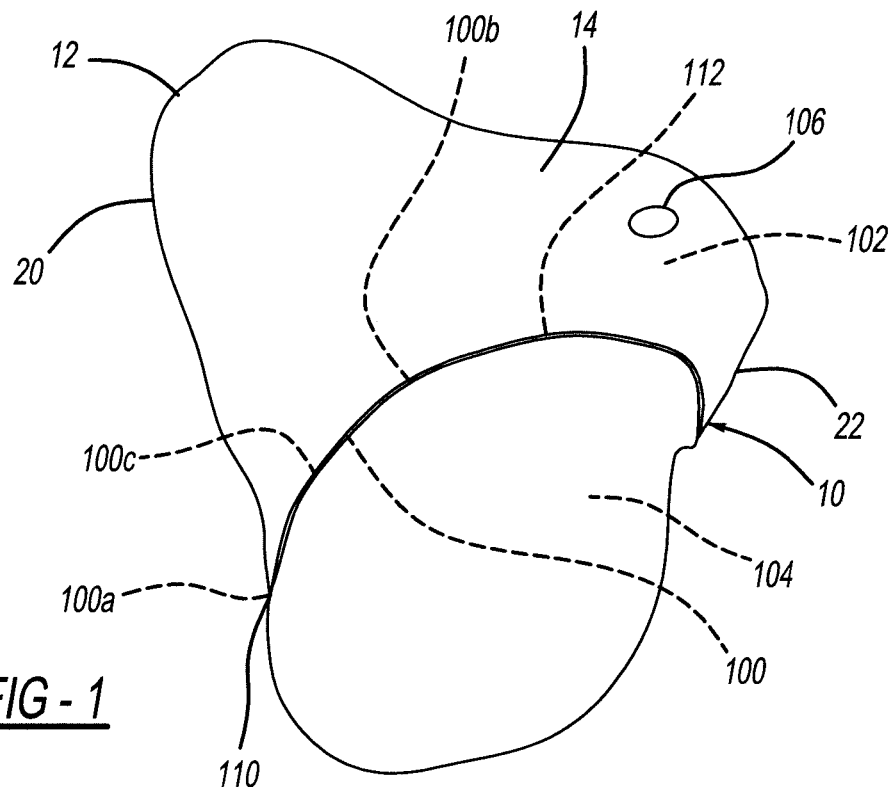
FIG. 1 is a side view of a passenger-side airbag (in an inflated state) in accordance with one embodiment of the present invention.
Figure 2:
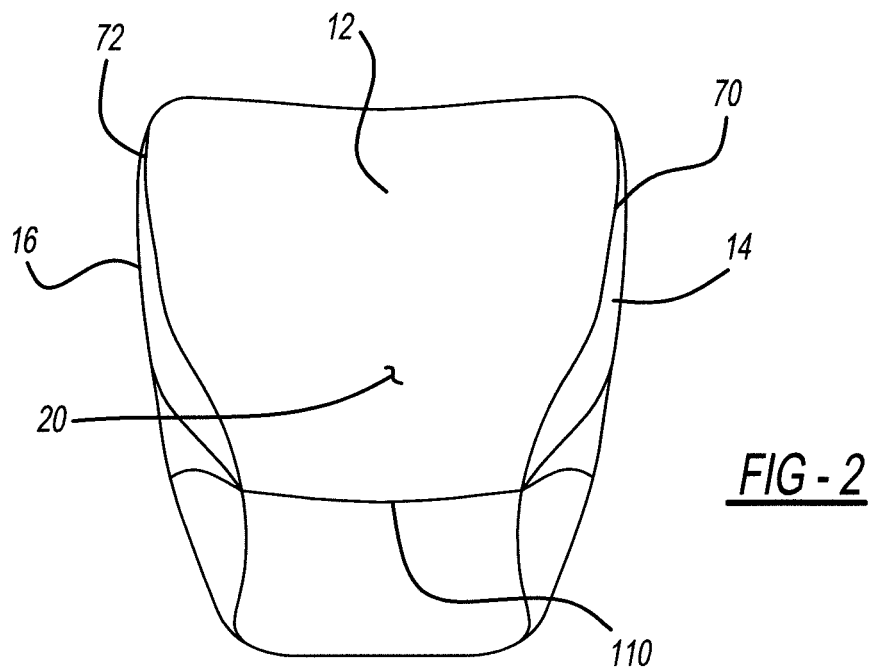
FIG. 2 is a front view of the airbag of FIG. 1.
Figure 3:
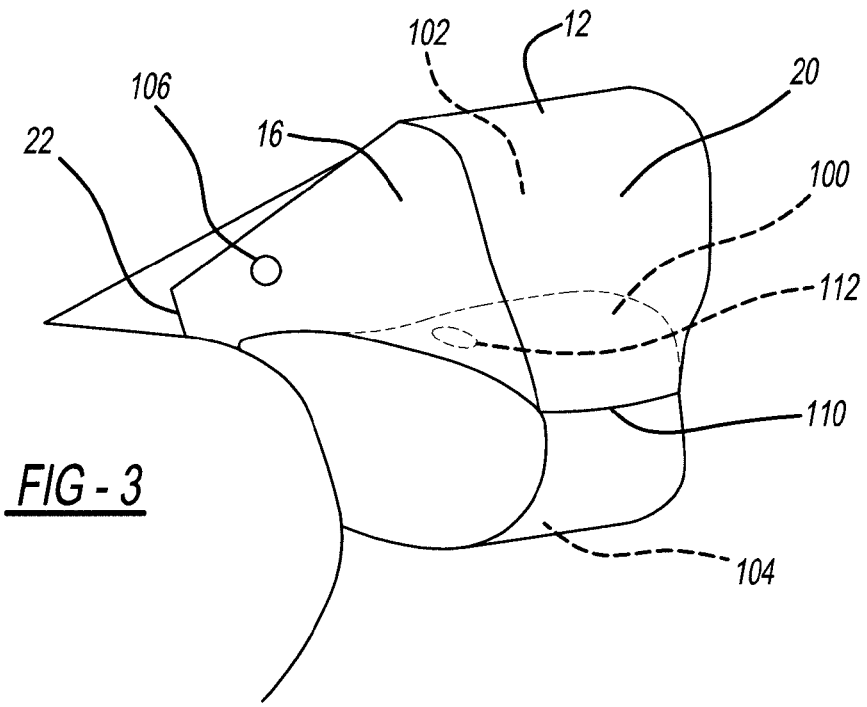
FIG. 3 is a schematic perspective view of the airbag of FIG. 1, showing elements of the airbag interior.

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are incorporated herein by reference in their entirety, but not by way of limitation.

FIGS. 1-4 are views of a passenger-side airbag 10 (in an inflated state) according to an embodiment of the present invention. The airbag embodiment shown in FIGS. 1-4 is formed from three panels. Specifically, the airbag is formed of a main panel 12, a right side (when viewing the airbag from a seated position) panel 14, and a left side panel 16 opposite the right side panel 14. Each of the side panels 14, 16 is generally planar (when the airbag 10 is not inflated). The main panel 12 connects the left and right panels and wraps around the airbag 10. As a result, the entirety of the right edge of the main panel 12 is connected along a seam 70 (e.g., by stitching, sewing, or other suitable means) to the right panel 14 and the entirety of the left edge of the main panel 12 is connected along a seam 72 (e.g., by stitching, sewing, or other suitable means) to the left panel 16.

The main panel 12 has both a front, impact side 20 and a rear, inflation side 22. After wrapping around the airbag 10, ends of the main panel 12 are joined at the rear inflation side 22. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile (or other device). The "front side" of the airbag or of main panel 12 is that portion of the airbag structured and positioned so as to be impacted first by a vehicle occupant when the airbag is activated.

Referring to FIGS. 1-4, a divider 100 is stitched or otherwise suitably attached along a perimeter thereof to interior surfaces or interior 10a of the airbag 10 or of the main, left and right panels. The divider 100 is attached to the panel interior surfaces along a seam 110 so as to restrict gas flow between the divider and the panels to which it is attached. In a particular embodiment, the divider 100 is attached to the panel interior surfaces along seam 110 so as to form a gas-tight seal between the divider and the panels to which it is attached. Divider 100 divides the airbag interior into an upper chamber 102 and a lower chamber 104.

Figure 7:
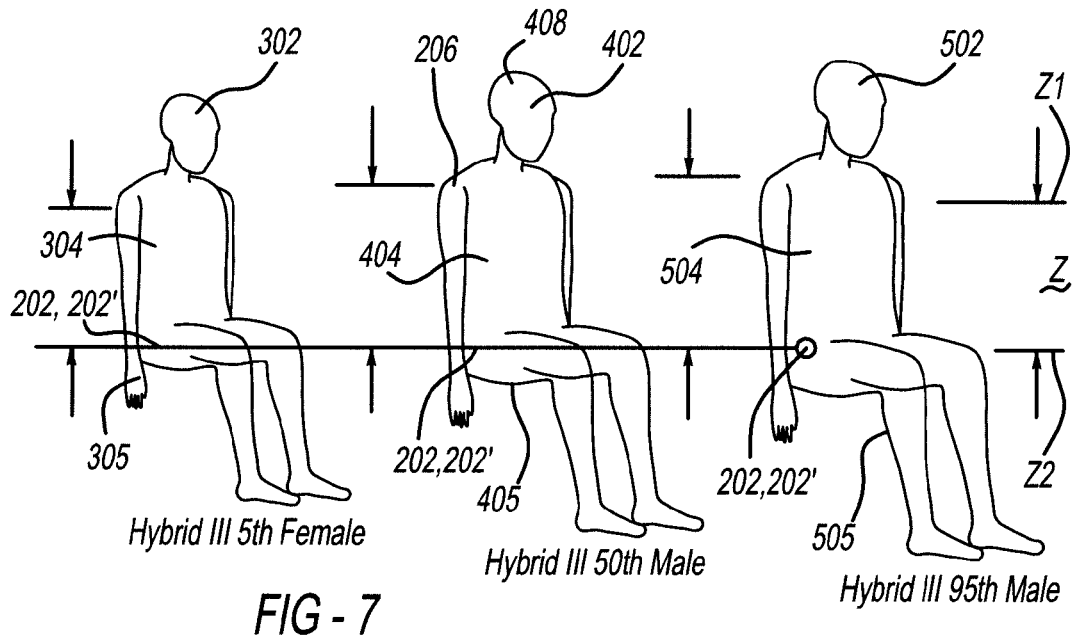
FIG. 7 is a schematic view showing relative proportions of Anthropomorphic Test Devices and relevant parameters used to define the desired positioning of the divider within the airbag, in accordance with embodiments of the present invention.

In the embodiments of the present invention, the inflated shapes of the airbag 10 and divider 100 and the positions of the intersections between divider 100 and the interior portions of the panels 12, 14, 16 to which the divider is attached are configured so as to ensure that the head and neck regions (collectively designated 302 for a Hybrid III 5th percentile female test ATD 305, 402 for Hybrid III 50th percentile male test ATD 405, and 502 for a Hybrid III 95th percentile male test ATD 505, as shown in FIG. 7) of passengers of various sizes impact the bag along the exterior of the upper chamber 102 of the bag (i.e., that the upper chamber 102 absorbs the impact of the head and neck regions of the passenger). The configuration of the divider 100, its positioning within the airbag, and the position of the portion 110a of the seam 110 attaching the divider leading edge 100a to the panel 12 enable the cushion to match the forward movement of the relatively heavier thoracic regions (generally designated 304 in ATD 305, 404 in ATD 405, and 504 in ATD 505) to the forward movement of the relatively smaller and lighter head & neck regions 302, 402, 502.

Referring to FIGS. 1-4, in one example, edge 100a of divider 100 attached to an interior surface of the front side 20 of main panel 12 defines a leading edge 100a of the divider 100. Leading edge 100a is attached to the main panel front side 20 along seam 110 and is configured such that the leading edge 100a and the portion 110a of the seam 110 attaching the leading edge to the front side will reside below the neck and head regions of any passenger contacting the airbag front side (more specifically, within the zone Z shown in FIG. 7 and defined below), when the airbag mounted in the vehicle and is fully inflated. In this configuration of the airbag, the passenger head and neck regions will always contact the airbag along an exterior of the bag upper chamber 102.

In the particular embodiment shown in FIGS. 1-4, divider 100 is attached to the inner surfaces of the airbag panels 12, 14, 16 so as to form a curved surface 100b having a downwardly angling portion 100c terminating in leading edge 100a connected to front side 20. However, the seams connecting the divider 100 to the main and side panels may have any locations and/or configurations necessary to facilitate attachment to the panel 12 at the desired location within zone Z as described herein. For example, FIG. 5 shows the airbag embodiment of FIGS. 1-4 in an inflated state and mounted in a vehicle.

Figure 6:
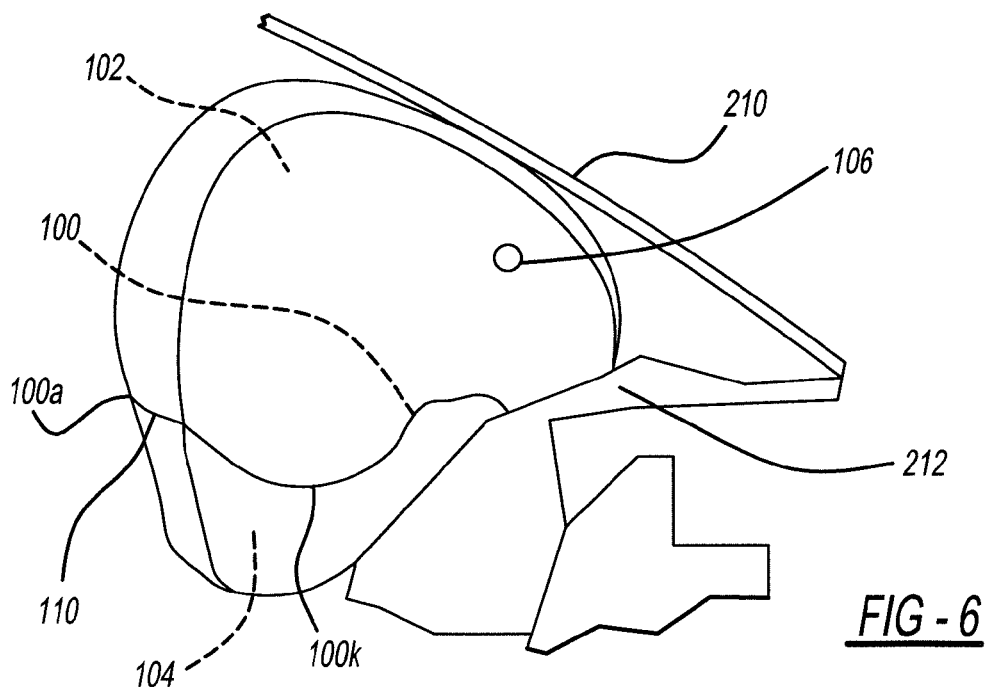
FIG. 6 is a perspective view of a passenger-side airbag in accordance with another embodiment of the invention, shown in an inflated state and mounted in a vehicle.

Referring to FIGS. 6 and 7, in the embodiments described herein, the divider leading edge 100a is attached to the main panel along a seam 110 positioned so as to reside within a zone Z defined at a lower end Z2 by the hip pivot 202 of a seated Hybrid III 5th female ATD 305, and at an upper end Z1 by the shoulder pivot 206 of a seated Hybrid III 50th ATD 405, inclusive. These boundary positions and other characteristics of all the test ATD's described herein are specified in 49 CFR Part 572, which is incorporated herein by reference in its entirety, and which may be found, for example, at http://www.gpo.gov/fdsys/pkg/CFR-2011-title49-vol7pdf/CFR-2011-title49-vol7-part572.pdf. In a particular embodiment, the hip pivot 202 of the seated Hybrid III 5th female ATD resides at a vertical distance of 3.30 inches above the portion of the seat in contact with the ATD, and the shoulder pivot 206 of the seated Hybrid III 50th male ATD resides at a distance of 17.5 inches above the portion of the seat in contact with the ATD. Thus, the dimension of the zone Z is 14.2 inches.

Figure 23:
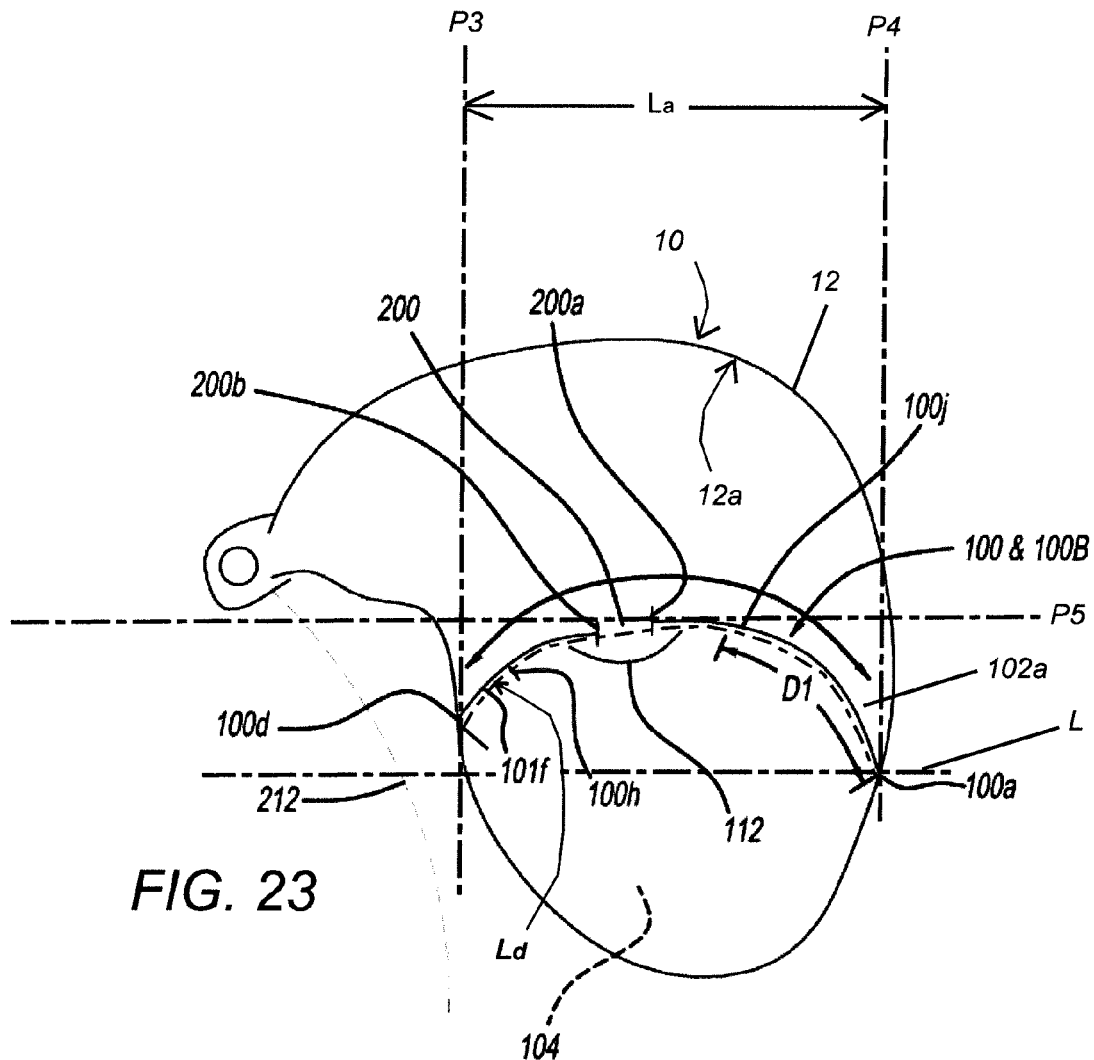
FIG. 23 is a cross-sectional side view of the airbag embodiment shown in FIG. 16 illustrating the effective horizontal length of the airbag as compared to the greater arcuate length of the divider panel.

While maintaining the positioning of the divider 100 as described herein and hereinabove, it will be appreciated that as shown in FIG. 23, the effective horizontal length of the inflated airbag proximate to the divider, $L_a$, is less than the effective length of the arcuate-spanning divider, $L_d$. It will be appreciated that as used herein, "arcuate length" is meant to convey that at least a portion of the divider length has an arcuate shape. As shown in FIG. 23, a vertical plane P3 tangentially extends through the attachment seam 100d proximate to the instrument panel. Another vertical plane P4 tangentially extends through a frontal portion of the attachment seam 100a on the occupant side 20 of the airbag, wherein P4 is at least substantially parallel to P3. A horizontal axis, L, extends along at least a portion of the divider 100 to partition the divider 100, whereby axis L orthogonally intersects P3 and P4 to define $L_a$ extending between P3 and P4. As also shown, the arcuate length $L_d$ spans between P3 and P4, that is between seams 100d and 100a, given that the divider 100 is of course positioned within the airbag 10. The relationship between these two lengths can be expressed as follows:

$$L_d \geq 1.05 L_a$$

and more preferably, $$L_d \geq 1.10 L_a$$

Stated another way, the length of the divider, ($L_d$), as it arcuately spans from attachment seam 100d to 100a, is at least 5 to 10% greater than the horizontal length of the deployed airbag, $L_a$, as it linearly spans from divider attachment seam 100d proximate the instrument panel to the divider leading edge 100a along the occupant side of the airbag. It will be appreciated that a plane P5 may horizontally extend through or near seam 100d and orthogonally intersect P3 and P4. Accordingly, a sub-chamber or region 102a is defined between the front or occupant-contact side of the airbag and the downturned portion of the divider 100, and therefore sub-chamber 102a resides below the plane P5 as the divider 100 downwardly and arcuately progresses to seam 100a.

Stated in yet another way, a passenger-side airbag 10 for an automotive vehicle contains at least one outer panel 12 forming an airbag 10, the outer panel 12 having an inner wall 12a and the airbag 10 also having a linear length $L_a$ extending toward a rear position of the automotive vehicle when the airbag is fully deployed. The airbag 10 farther contains a perforated divider 100 (containing one or more valves or openings 200) sealed and fixed to the inner wall 12a thereby forming an upper chamber 102 and a lower chamber 104 within the airbag 10, the divider 100 having an arcuate length extending from the instrument panel toward the rear of the automotive vehicle when the airbag 10 is fully deployed, wherein the arcuate length is at least 5% greater than the linear length.

It will be appreciated that the additional length of the divider 100 results in a sub-chamber or sub-region 102a of upper chamber 102. It is believed that the region 102a not only provides sufficient airbag stiffness for adult occupants as shown in ATD testing per FMVSS208 (updated as of Oct. 28, 2013), incorporated herein by reference in its entirety, but that it contributes to an initial upward and then shrouding trajectory of the airbag as it envelopes the head of the out-of-position 2 H-III 3-year old or H-III 6-year old as described herein with minimal force thereupon. Based on head and neck injury data developed from ATD testing pursuant to FMVSS208, it is believed that region 102a and the related divider design features unexpectedly and surprisingly contributes to both the enhanced protection of the adult occupants as well as the enhanced protection for out-of-position youths.

Figure 8:
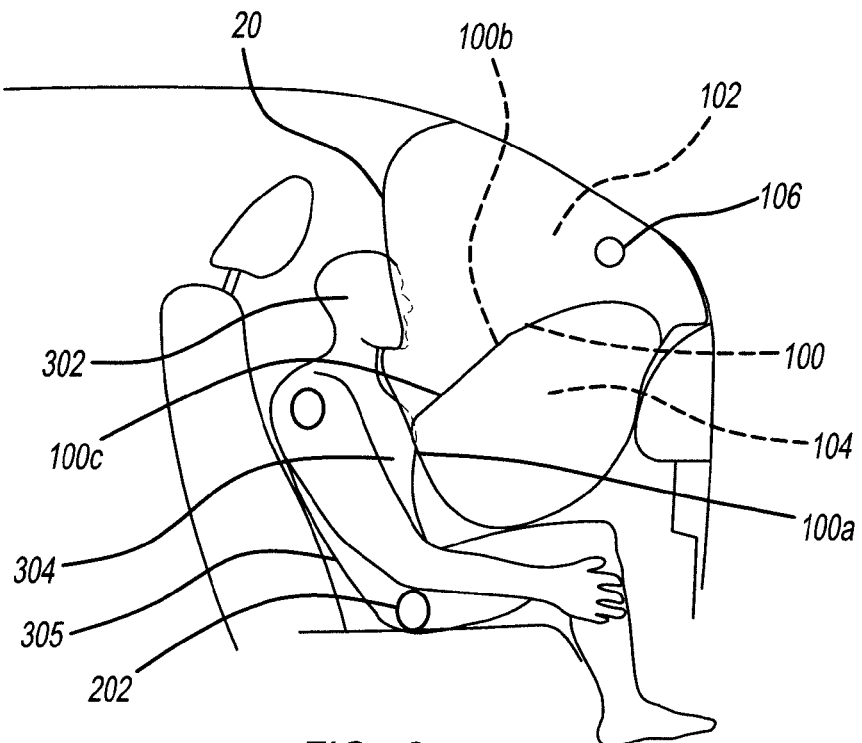
FIG. 8 is a side view of a Hybrid III 5th percentile female test Anthropomorphic Test Device contacting a deployed airbag in accordance with positioning of the divider within the airbag, in accordance with embodiments.
Figure 9:
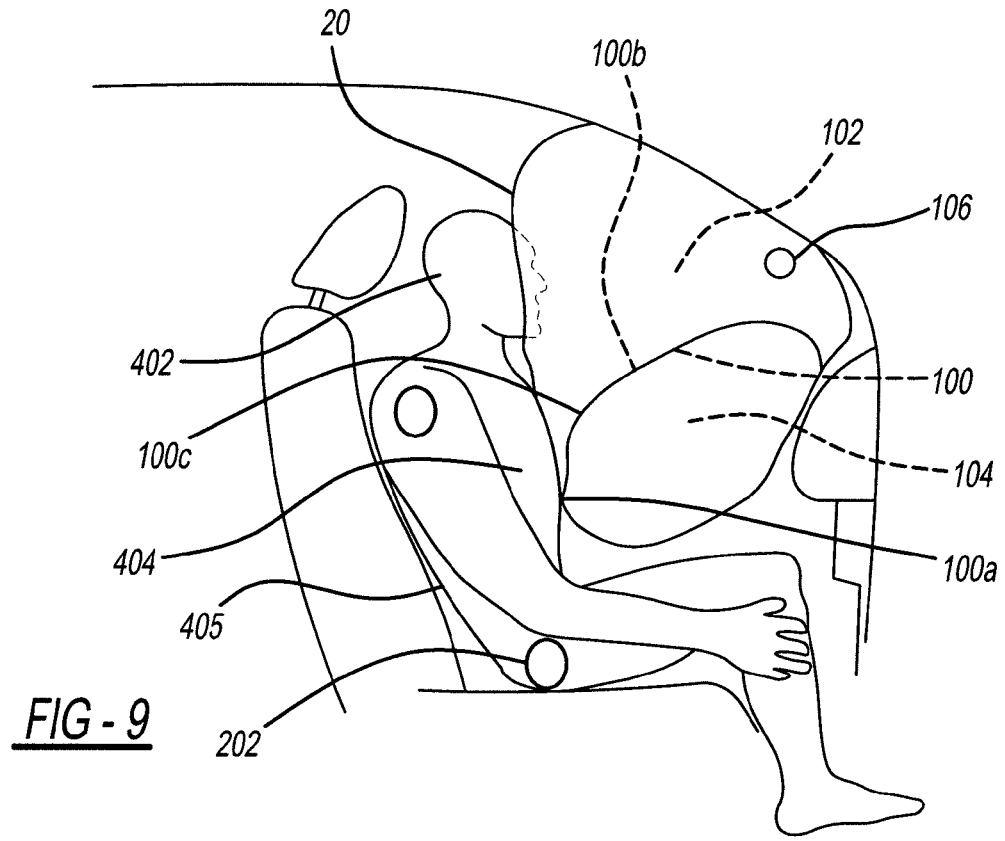
FIG. 9 is a side view of a Hybrid III 50th percentile male Anthropomorphic Test Device contacting a deployed airbag in accordance with positioning of the divider within the airbag, in accordance with embodiments.

It is noted that the hip pivots of the seated ATD's 305, 405, and 505 are collinear or at the same level, so that the hip pivot of the seated Hybrid III 50th male ATD 405 may be referred to as 202'. This common boundary of the zone Z may also serve as a reference axis. Also, in this embodiment, the portions of the body located above the respective shoulder pivots on ATD's 305, 405 and 505 are considered to define the respective head and neck regions of the ATD's. FIG. 8 shows contact between the front or contact face of a deployed airbag 10 and the divider leading edge seam 110a positioned as just described, and a Hybrid III 5th female ATD 305. FIG. 9 shows contact between a deployed airbag 10 of the same design shown in FIG. 8, and a Hybrid III 50th as ATD 405. It is seen that both of ATD's 305 and 405 contact the seam 110a connecting the divider leading edge 100a to the airbag main panel 12 within the zone Z previously described.

Figure 4:
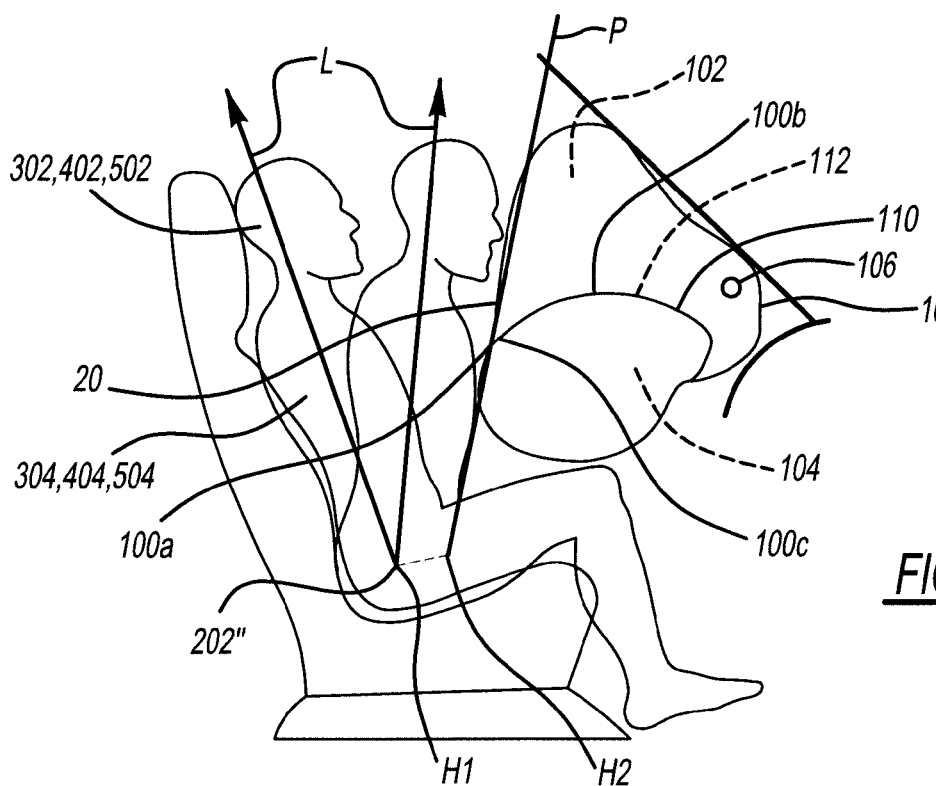
FIG. 4 is a side view of the airbag of FIG. 1 mounted and deployed in a vehicle in front of a seated passenger.
Figure 5:
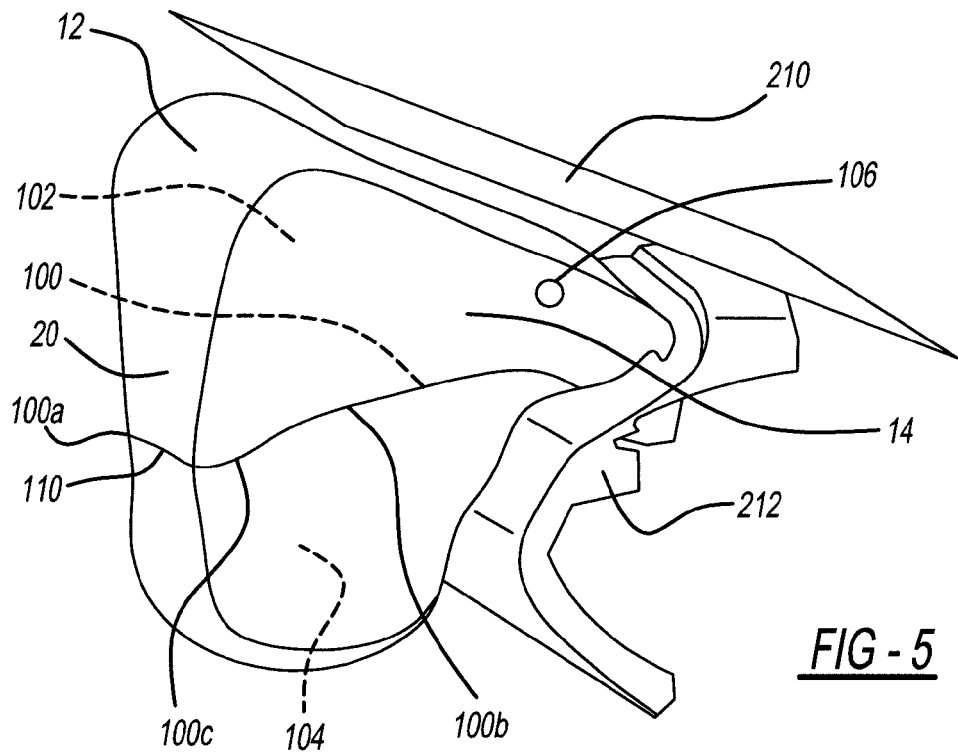
FIG. 5 is a perspective view of the passenger-side airbag of FIGS. 1-4, shown in an inflated state and mounted in a vehicle.

In the embodiments described herein, the various airbag elements are shaped and connected to each other so that, when fully inflated, the front side 20 of the bag aids in maintaining alignment of the head, neck, and thoracic body regions along a line L as shown in FIG. 4 during impact with the airbag and after contact with the bag. It is desirable to maintain this alignment during and after contact with the bag, so that the entire upper body of the passenger (i.e., the head, neck, and thoracic regions) effectively pivots about the hip axis of the passenger, as shown in FIG. 4. To this end, as seen in FIG. 4, the bag is structured such that the portions of the inflated bag front side 20 contacted by the passenger form an essentially flat plane, indicated by the line P in the drawing. It is also desirable that the line L along which these body regions lie be parallel with the plane P during and after impact with the airbag, to aid in preventing differential motion of the head/neck region and the thorax region (i.e., a bending of the neck and head regions relative to the thorax).

An inter-chamber venting system is provided to permit gas to flow from the upper chamber into the lower chamber, and also for controlling or restricting backflow from the lower chamber 104 into the upper chamber 102.

In one embodiment, a flow restriction valve 112 (shown schematically in the drawings) is incorporated into or otherwise operatively coupled to divider 100 for controlling flow between the upper and lower chambers. The valve is structured such that an actuation response time of the valve in attenuating or impeding gas flow from lower chamber 104 into upper chamber 102 is proportional to the pressure differential between the upper and lower chambers. The valve is also structured such that a backflow rate of gases through the valve and into the upper chamber is proportional to the pressure differential between the upper and lower chambers.

Valve 112 may have any of a number of structures suitable for controlling gas flow in the airbag interior, in the manner described herein. In one embodiment, the valve has the structure shown in U.S. Patent Application No. 61/862,491, incorporated herein by reference in its entirety. In another embodiment, the valve has the structure shown in U.S. Patent Application No. 61/865,095, incorporated herein by reference in its entirety. The gas flow rate from the upper chamber 102 into the lower chamber 104 may be controlled in a known manner by controlling the valve structure and dimensions.

Portions of one or more of panels 12, 14, 16 defining upper chamber 102 incorporate one or more vents (not shown) therein to release gas from the upper chamber to the environment exterior of the airbag in a controlled manner during contact between a passenger and the airbag.

Operation of an airbag in accordance with an embodiment of the invention, and movement of the vehicle occupant's body prior to and during contact with a deployed airbag is illustrated in FIG. 4.

FIGS. 10-14 show a typical deployment/passenger contact sequence using an airbag in accordance with an embodiment of the present invention. FIGS. 8 and 9 show portions of collision tests using ATD's 305 and 405, respectively, meeting the specifications previously described, after deployment of the airbags and stoppage of passenger forward motion.

Figure 10:
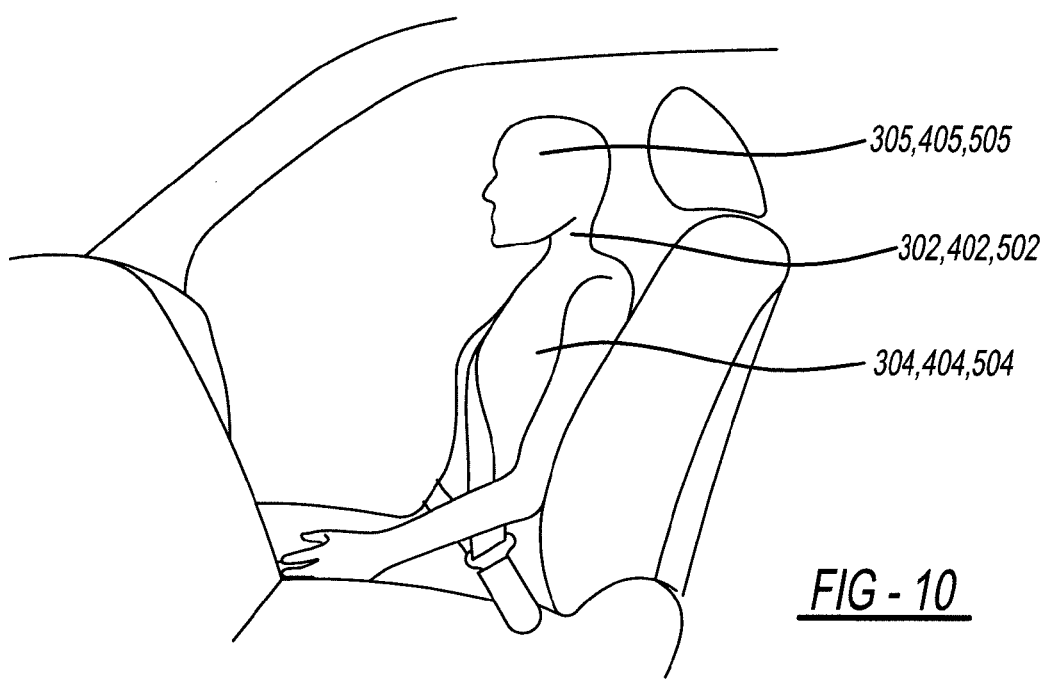
FIG. 10 is a side view of a vehicle passenger compartment showing a seated Anthropomorphic Test Device prior deployment of a vehicle airbag.

Referring to FIG. 10, prior to bag deployment, an ATD 305, 405, 505 is seated and airbag 10 (not shown) is operatively coupled to an associated gas generating system or other inflation fluid source (not shown), in a manner known in the art. The inflation fluid source may be operatively coupled to a collision event sensor (not shown) that includes (or is in operative communication with) a controller (not shown) which signals activation of the airbag system in the event of a collision. The airbag and its associated inflation means are configured to provide rapid inflation of the airbag (and especially upper chamber 102) so as quickly engage and cushion the forward-moving head & neck region and (at a slightly later point in time) the thoracic region of the passenger, while utilizing a singular cushion volume to aid in reducing the inertia of the individual.

Figure 11:
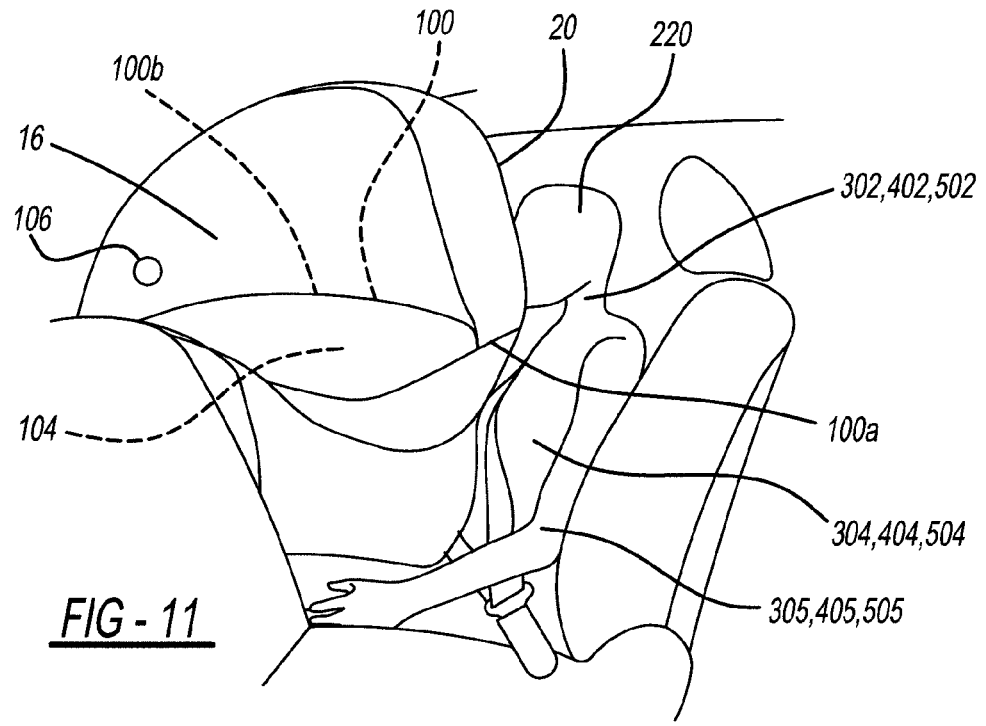
FIG. 11 is the side view of FIG. 10 just after the airbag has been activated and begins to deploy.
Figure 12:
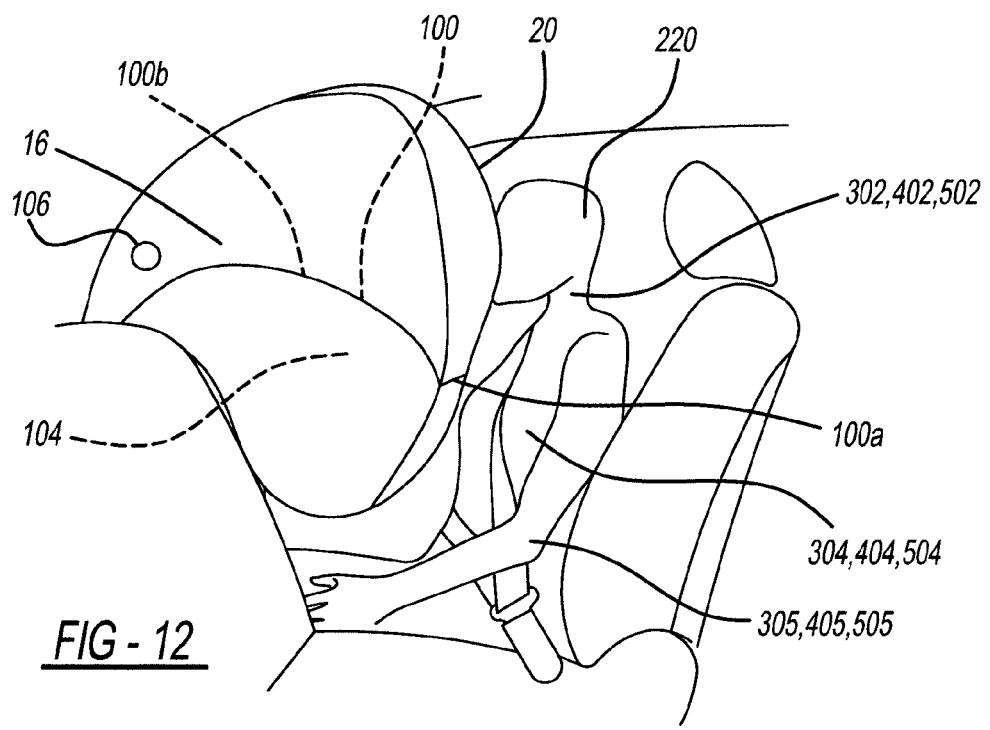
FIG. 12 is the side view of FIG. 11 after additional time has elapsed after airbag activation.
Figure 13:
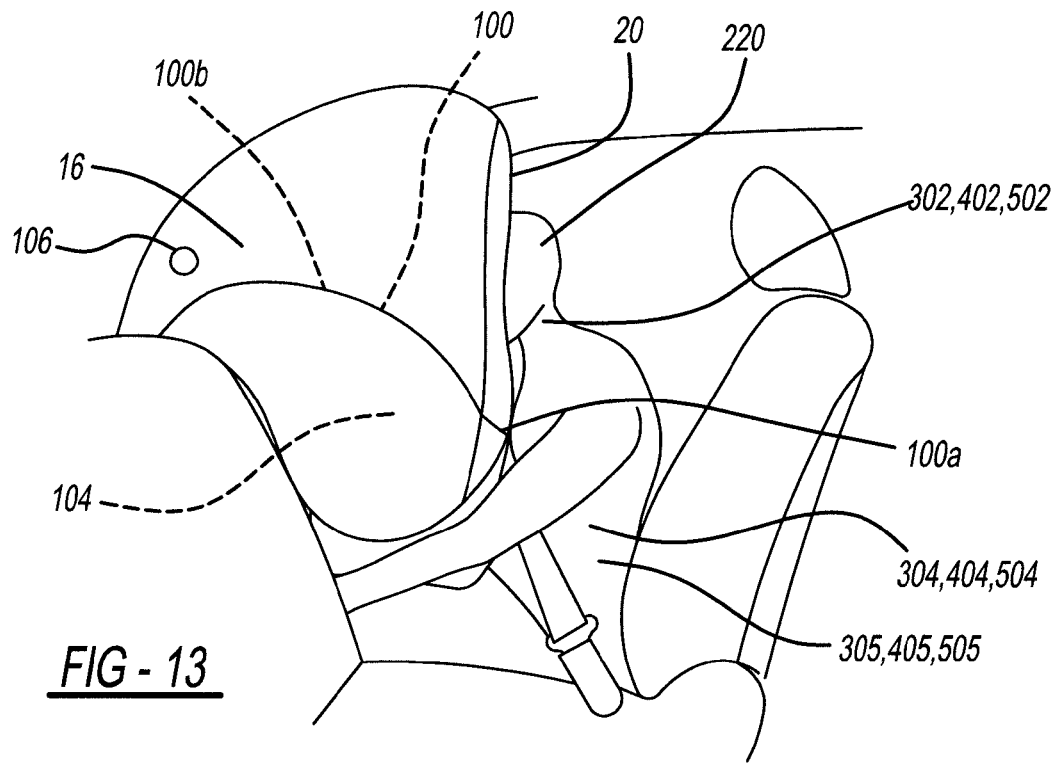
FIG. 13 is the view of FIG. 12 after full contact of the head and neck regions of the passenger with the airbag.
Figure 14:
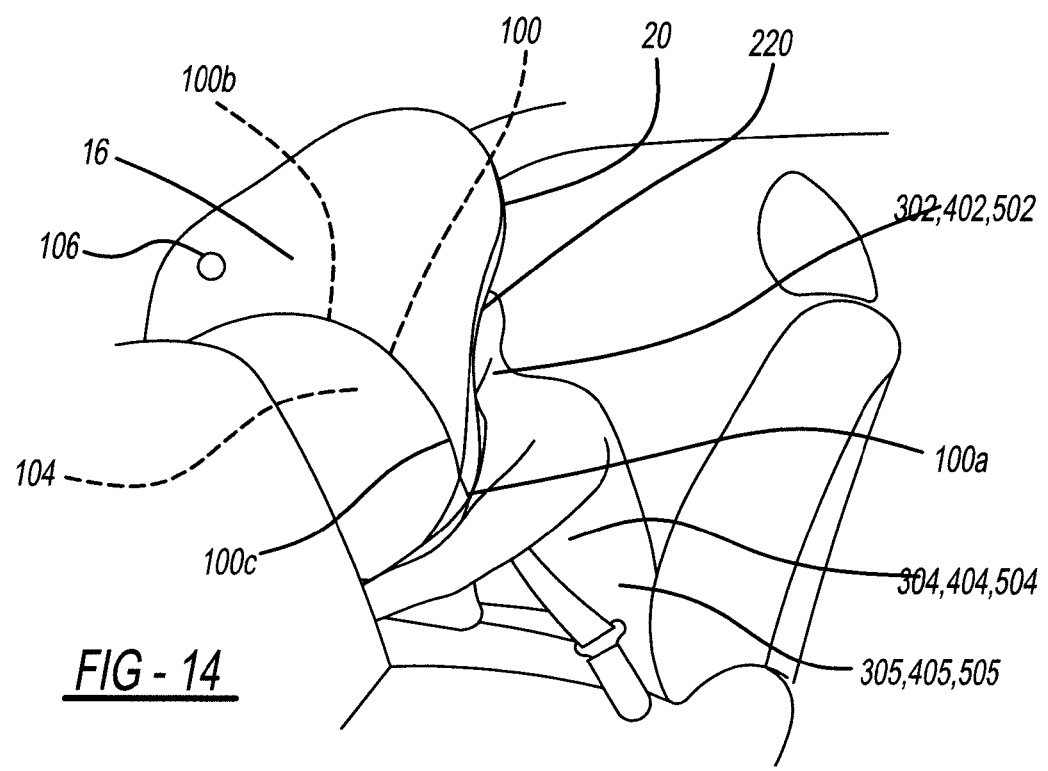
FIG. 14 is the view of FIG. 13 after contact of the thoracic region of the passenger with the seam of the leading edge of the airbag divider panel.

Referring now to FIGS. 11 and 12, when the system is activated, inflation gas flows from the inflation fluid source into upper chamber 102, rapidly inflating the upper chamber to enable this chamber to intercept the forward-moving head and neck regions as soon as possible, to aid in minimizing the momentum built up by the head and neck regions. At this early stage of airbag inflation, the occupant seatbelt tensions to maintain the occupant's lower thoracic region in the seat. Inflation gas then flows from the upper chamber 102 through valve 112 into lower chamber 104 to pressurize the lower chamber for supporting the occupant thoracic region when the seatbelt tensioner releases. Referring to FIGS. 13 and 14, when the lower chamber is filled, valve 112 actuates responsive to pressure in lower chamber 104 to attenuate or restrict the flow of gas back into the upper chamber 102. Also, as seen in FIGS. 8, 9, 13 and 14, contact between the ATD's and the airbag leading edge 100a occurs within respective zones Z defined by the hip and shoulder joint locations on the bodies of the ATD's as previously described. Referring to FIGS. 4, 8, 9, 13 and 14, it is seen that the divider leading edge seam 110 contacts the passenger between the hip pivot 202" of the passenger and the shoulder pivot 206" of the passenger.

Referring to an embodiment shown in FIGS. 13 and 14, if the thorax region of a relatively larger, heavier occupant impacts the portion of the airbag exterior enclosing the lower chamber, the pressure in the lower chamber rises relatively rapidly, causing the valve 112 to actuate relatively quickly to restrict gas flow back into the upper chamber, thereby maintaining a relatively higher pressure in the lower chamber. This higher pressure stiffens the airbag and helps to cushion and absorb the relatively greater mass of the heavier occupant. However, if the thorax region of a relatively smaller or lighter occupant impacts the portion of the airbag exterior enclosing the lower chamber, the pressure in the lower chamber rises relatively more slowly, causing the valve 112 to actuate more slowly to restrict gas flow back into the upper chamber. This enables the lower chamber pressure to fall to a relatively lower level, causing the lower portion of the bag to be less stiff in cushioning and absorbing the relatively smaller mass of the lighter occupant. As gases are forced from the lower chamber into the upper chamber through the valve 112, the lower chamber of the airbag continues to deflate and deflect so as to absorb energy.

In the same manner, as the passenger head and neck regions 302, 402, 502 contact the airbag, gases received in the upper chamber from the inflator and gases received through the valve via backflow from the lower chamber are vented to the bag exterior through the upper chamber vents 106 (shown schematically in FIG. 1), resulting in a reduction of upper chamber pressure and a "softening" of the bag front surface over the upper chamber, responsive to contact with the passenger's head and neck regions. This softening aids in providing support sufficient to protect the occupant's head and neck region, while helping to minimize the contact forces between the head/neck region and the airbag. The resistance provided by the bag to forward motion of the head and neck regions by the upper chamber is relatively less than the resistance provided to the thorax region by the lower chamber, due to the relatively lesser mass and inertia of the head and neck region. In this manner, proportional restraint of the occupant's thorax is achieved (i.e., the degree of stiffness or support is proportional to the mass and inertia of the occupant).

In addition, because of valve 112, the lower chamber pressure is maintained at a relatively high level, thereby maintaining the firmness of the bag surfaces exterior of the lower chamber in response to contact with the passenger. This facilitates pivoting of the passenger's upper body about the hip axis and maintenance of alignment of the thoracic and head and neck regions along axis L. Furthermore, the levels of restraint or resistance to forward motion (i.e., the stiffnesses) provided by each of the upper and lower chambers can be tuned or adjusted by appropriate modification of the valve and vent design parameters.

In the manner described above, the airbag is structured to include a region of relatively higher internal pressure for supporting a thoracic region of a vehicle occupant after airbag activation, and structured to include a region of relatively higher internal pressure for supporting a head and neck region of a vehicle occupant after the airbag activation.

It has been found that passenger-side airbags structured as described herein are more efficient with regard to usage of inflation gas than other airbag designs. This characteristic enables a relatively lower-output inflator or gas source to be used to inflate the airbag, rather than using a conventional dual-stage inflator, as the generated gas is conserved through all phases of the occupant protection event.

As described above, the airbag embodiments described herein provide restraint to the different body regions (head/neck and thorax) of the occupant according to the mass and inertia of each region. The stiffness of the airbag responsive to bodily contact may be adjusted by modifying the flow characteristics of the valve 112 connecting the upper and lower chambers. The stiffness of the lower chamber 104 may be reduced by modifying the valve 112 so as to permit a relatively greater flowrate of gas back into the upper chamber 102 responsive to pressure exerted on the lower chamber by the vehicle occupant. Conversely, the stiffness of the lower chamber 104 may be increased by modifying the valve 112 so as to permit only a relatively lower flowrate of gas back into the upper chamber 102 responsive to pressure exerted on the lower chamber by the vehicle occupant.

In another example, the stiffness of the upper chamber 102 may be reduced by modifying the upper chamber vents so as to permit a relatively greater flowrate from the upper chamber into the atmosphere responsive to pressure exerted on the upper chamber by the vehicle occupant. Conversely, the stiffness of the upper chamber 102 may be increased by modifying the upper chamber vents so as to permit only a relatively lower flowrate from the upper chamber into the atmosphere responsive to pressure exerted on the upper chamber by the vehicle occupant.

It has been found that passenger-side airbags structured as described above are especially effective in providing optimal cushion performance for both relatively larger and relatively smaller occupants. This bag structure enables the airbag surfaces to deflect responsive to contact with both the heavier thoracic region and the smaller and lighter head and neck region, so as to help maintain body alignment along line L (FIG. 4) during contact between the passenger and the airbag.

In another aspect of the embodiments described herein, a volume ratio (VR) of the airbag is defined as:

$$VR = V_{upper}/(V_{upper} + V_{lower}),$$

where $V_{upper}$ is the volume of the upper chamber 102 when fully inflated and $V_{lower}$ is the volume of the lower chamber 104 when fully inflated. As a result of the positioning of leading edge 100a so as to reside in zone Z as described herein, the embodiments of the present invention define a range of ratios of the upper chamber volume $V_{upper}$ when fully inflated to the total interior airbag volume ($V_{upper} + V_{lower}$) when fully inflated. In the embodiments described herein, the range of desired volume ratios is 35% to 85% inclusive. Stated another way, the range of volume ratios of the airbag is governed by the following relation:

$$35\% \leq V_{upper}/(V_{upper} + V_{lower}) \leq 85\%$$

The governing equation for the volume ratio for dual-chambered airbags in accordance with embodiment of the present invention is the ratio of the upper chamber alone over the total of both upper and lower chambers measured simultaneously, using the Ping Pong Ball Volume Method.

The particular volume ratio selected for a given airbag application is determined by such factors as the relative locations and dimensions of interior features of the vehicle in which the airbag is to be used. These characteristics determine the volume between the seated passenger, a windshield 210 and an instrument panel 212 (or other bag stowage location), for example, available for deployment of the airbag. For example, a relatively smaller available deployment space may require a relatively smaller airbag. In this case, the airbag volume ratio ($V_{upper}/(V_{upper} + V_{lower})$) may need to be tailored as described herein in order to optimize occupant protection.

The structure of the divider 100 and the locations at which the divider is attached to the main and side panels may be specified so as to provide a desired volume ratio within the specified range. For example, a relatively greater volume ratio may be achieved by locating and securing the divider at as relatively lower position within the airbag interior, so that the upper chamber volume is larger relative to the total interior volume of the bag. Conversely, a relatively lower volume ratio may be achieved by locating and securing the divider at a relatively higher position within the airbag interior, so that the upper chamber volume is smaller relative to the total interior volume of the bag.

FIG. 6 shows an embodiment of the divider position within the airbag interior, adjusted to provide a relatively greater volume ratio $VR = V_{upper}/(V_{upper} + V_{lower})$. In this variation, the divider 100 is configured and attached to the interior surfaces of the bag panels so as to form a depression 100k just behind the leading edge attachment 110a.

Figure 19A:
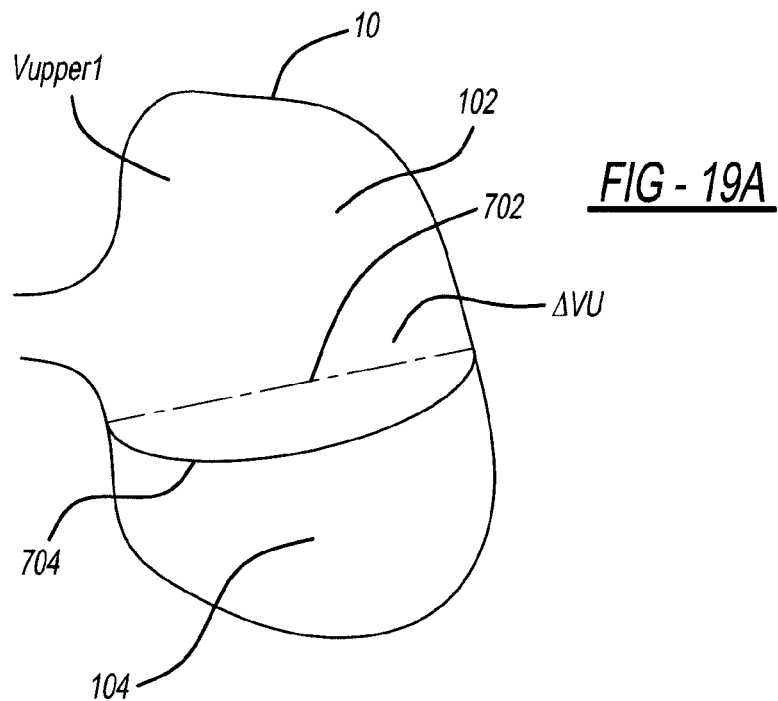
FIGS. 19A and 19B are schematic cross-sectional side views of an airbag in accordance with an embodiment described herein, showing a portion of the airbag interior volume shared by the upper and lower chambers when the hag is inflated.
Figure 19B:
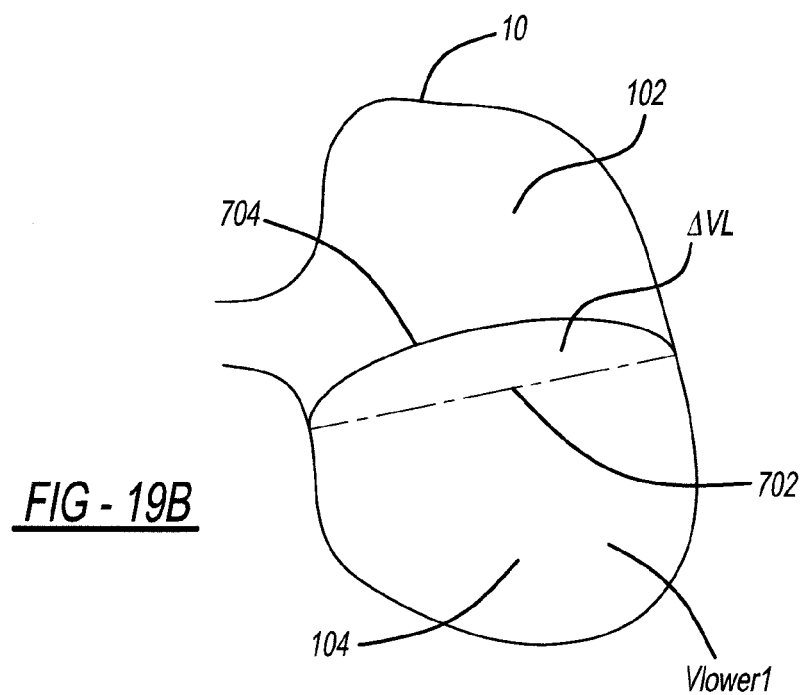

Referring to FIGS. 19A and 19B, in a particular embodiment, it has also been found that the divider 100 can be structured and attached to the front panel 12 and side panels 14 and 16 such that the sum ($V_{upper} + V_{lower}$) of the volumes of the upper and lower chambers 102 and 104 after attachment of the divider and when the airbag is in a fully inflated condition, is greater than the internal volume $V_{overall}$ of the airbag (as defined by only panels 12, 14 and 16) without the divider attached and in a fully inflated condition.

This is due to the upper chamber volume $V_{upper}$ including both a $V_{upper1}$ (as measured when the upper and lower chambers have the same internal pressures, represented as divider configuration 702 in FIG. 19A) and an additional volume $\Delta VU$, which is the difference between $V_{upper1}$ and the expanded upper chamber volume (represented as divider configuration 704 in FIG. 19A) produced when a pressure differential between the chambers causes a net deflection of the divider 100 toward lower chamber 104 (FIG. 19A). The effect described is also due to the lower chamber volume $V_{lower}$ including both a $V_{lower1}$ (as measured when the upper and lower chambers have the same internal pressures, represented as divider configuration 702 in FIG. 19B) and an additional volume $\Delta VL$, which is the difference between $V_{lower1}$ and the expanded lower chamber volume (represented as divider configuration 706 in FIG. 19B) produced when a pressure differential between the chambers causes a net deflection of the divider 100 toward upper chamber 102 (FIG. 19B). Thus, in this embodiment, a sum of the volume $V_{upper}$ of the upper chamber in a fully inflated condition and the volume $V_{lower}$ of the lower chamber in a fully inflated condition is greater than a fully inflated internal volume $V_{overall}$ of the airbag without the divider positioned therein.

It has been found that a ratio ($V_{upper} + V_{lower})/V_{overall}$ having a value of up to 1.2 may be provided by attaching a suitably configured divider to the outer airbag panels. Thus, the sum ($\Delta V_{upper} + \Delta V_{lower}$) may comprise up to 20 percent of $V_{overall}$. In a particular embodiment, $\Delta VL = \Delta VU$.

Figure 15:
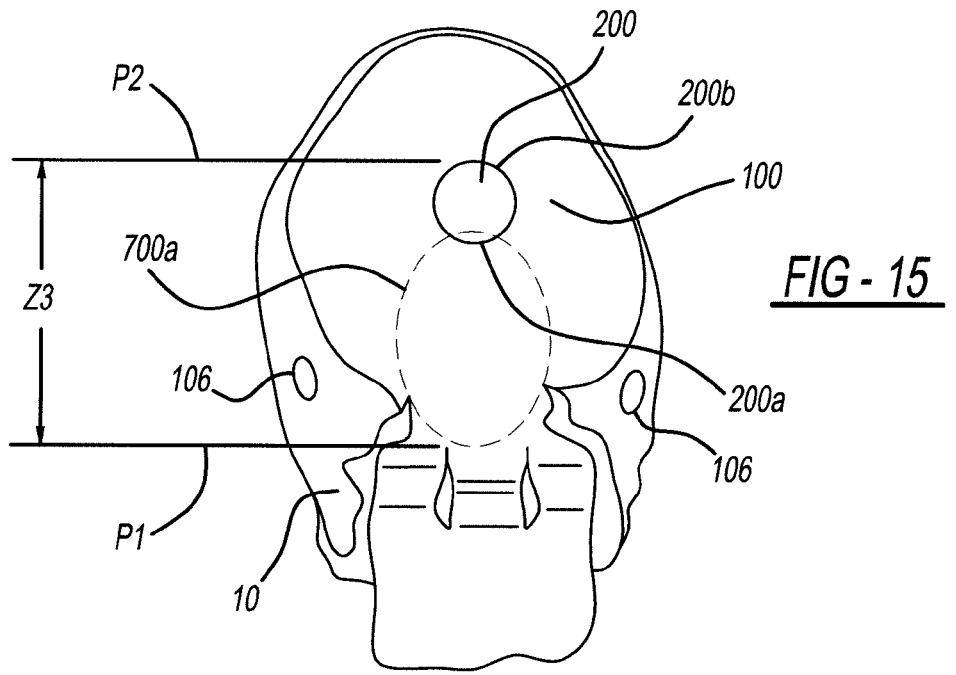
FIG. 15 is a dividing panel in plan view of an uninflated airbag showing a location of a representative inter-chamber vent opening in the divider.
Figure 16:
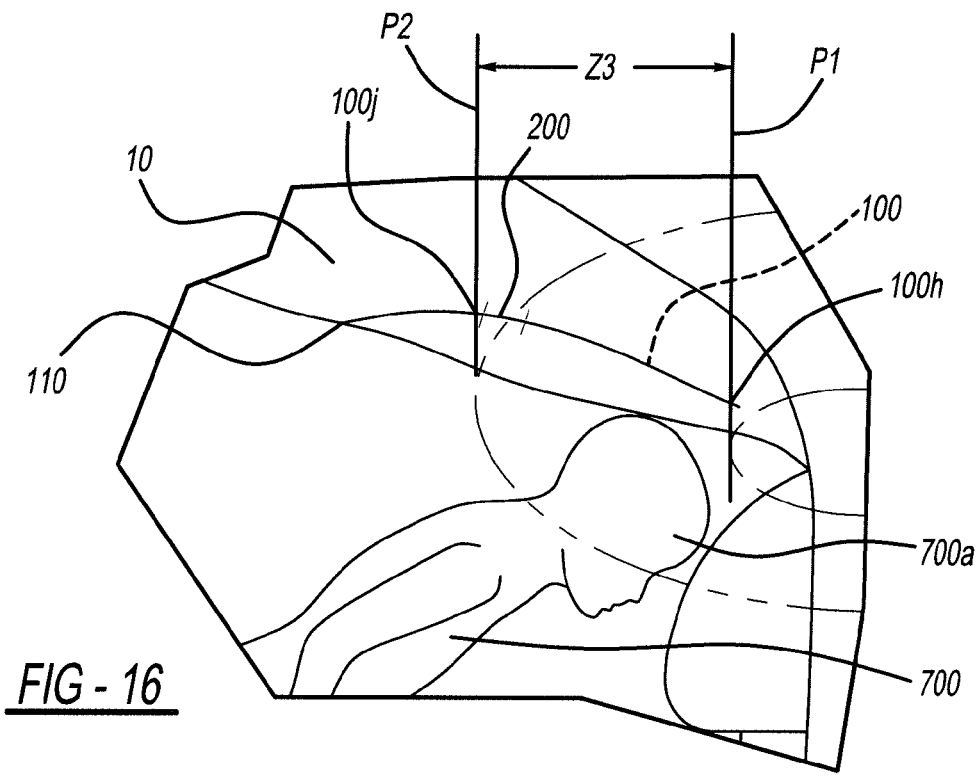
FIG. 16 is a side view of a portion of the airbag shown in FIG. 15 in an inflated state, showing a location of the inter-chamber venting, and showing the initial stage of inflation of one embodiment of the airbag.
Figure 16A:
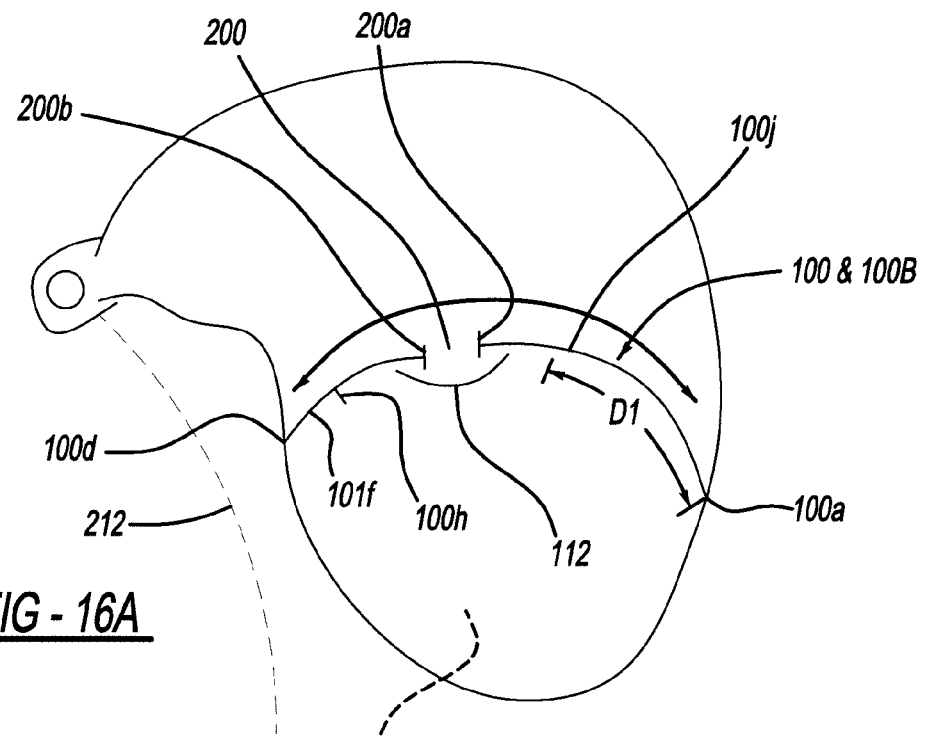
FIG. 16A is cross-sectional side view of the airbag embodiment shown in FIG. 16.
Figure 17:
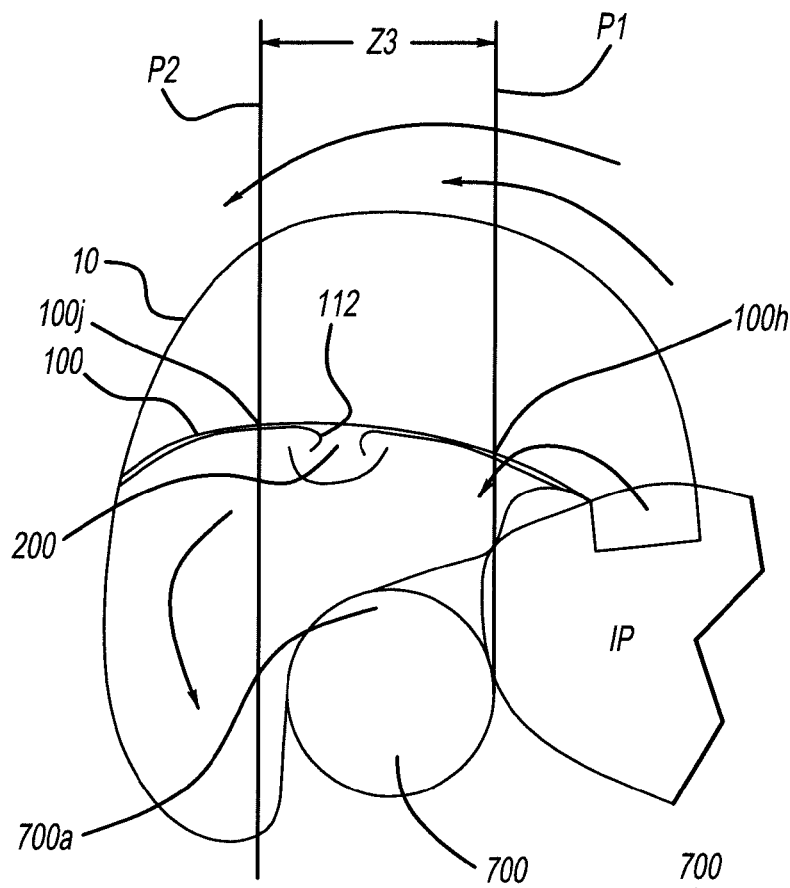
FIG. 17 is a side view of the airbag of FIG. 16 showing a later stage of inflation of the airbag.

Referring to FIGS. 15-17, in yet another embodiment, a valve mechanism 112 controls and provides a directional gas flow through one or more openings 200 (FIG. 15) formed in divider 100. Opening(s) 200 are provided to enable fluid communication from upper chamber 102 into lower chamber 104. It has been found that airbag performance after activation and during filling is affected by the distance (or distances) 100f of the opening(s) 200 from the inflator side 22 of the airbag (as seen in FIG. 16a), and also by the distance (or distances) of the opening(s) 200 from the front or passenger side 100a of the airbag along an axis extending parallel to the fore-aft axis of the vehicle. More specifically, if leading edge 200a of the openings 200 (or the leading edge of any opening, if multiple openings are used) is located nearer to the occupant contact side of the cushion than a location 100j defined by a distance D1 from the occupant side (as measured from the seam connecting the divider 100 with the front portion of main panel 12 and along a surface of the divider, the airbag will have a tendency to pull excessively downward during inflation of the upper chamber 102, thereby pulling the airbag out of the desired alignment with the passenger's body shown in FIG. 4, prior to contact between the passenger and the inflating airbag.

Also, if a rear-most edge 200b of the opening 200 (or the rearmost edge of any opening, if multiple openings are used) is located closer to the inflator side 22 of the airbag than a location 100h (residing a predetermined distance 100f along the a surface of the divider 100 from the inflator side 22), the movements of the components of the valve mechanism 112 may be constricted by proximity to the instrument panel profile (as denoted by line 212 in FIG. 16A), thereby impairing valve operation. Thus, at locations along the divider between planes P1 and P2 (passing through 100h and 100j) is an interval or zone in which the opening or openings 200 should be positioned to achieve adequate gas flow to fill the lower chamber.

While movement of the leading edge(s) 200a past the distance D1 and farther away from the front portion of the main panel 12 mitigates excessive downward pull of the airbag during the initial stages of inflation, thereby improving the overall performance of the bag with respect to an adult occupant, this positioning of the opening(s) may result in less-than-optimum performance for Out of Position-1 children. There is a balance between these requirements which may be tuned for a specific vehicle or specific application in order to achieve the best overall performance both early and later in the deployment event, and for both types of passenger. Between planes P1 and P2 lie an optimal location or locations for tuning the initial cushion fill and cushion pitch to achieve the desired results for a given application. The exact desired location of the opening (or openings) 200 for a particular application may be determined iteratively, by experimentation, or analytically.

Figure 18:
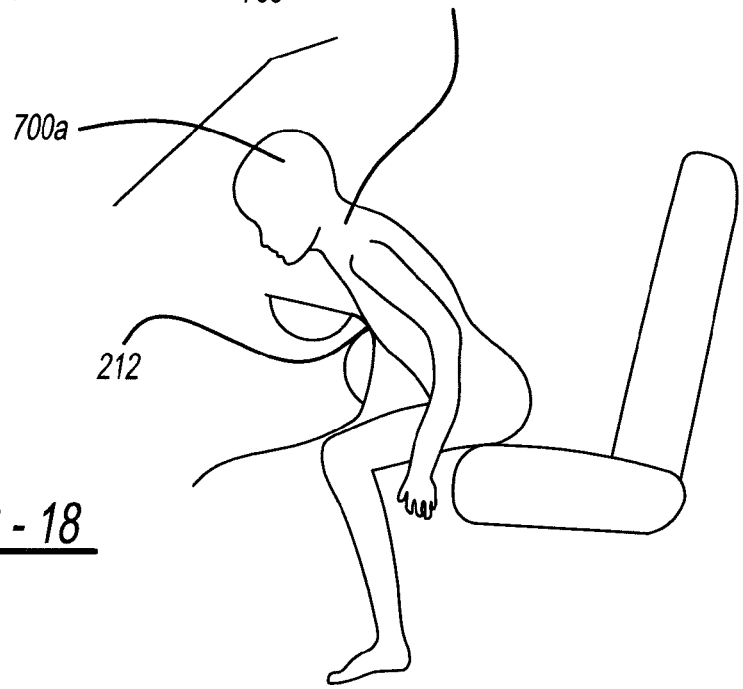
FIG. 18 is a schematic view of an Anthropomorphic Test Device positioned in Position-2 for Out of Position testing under FMVSS Standard No. 208.
Figure 20:
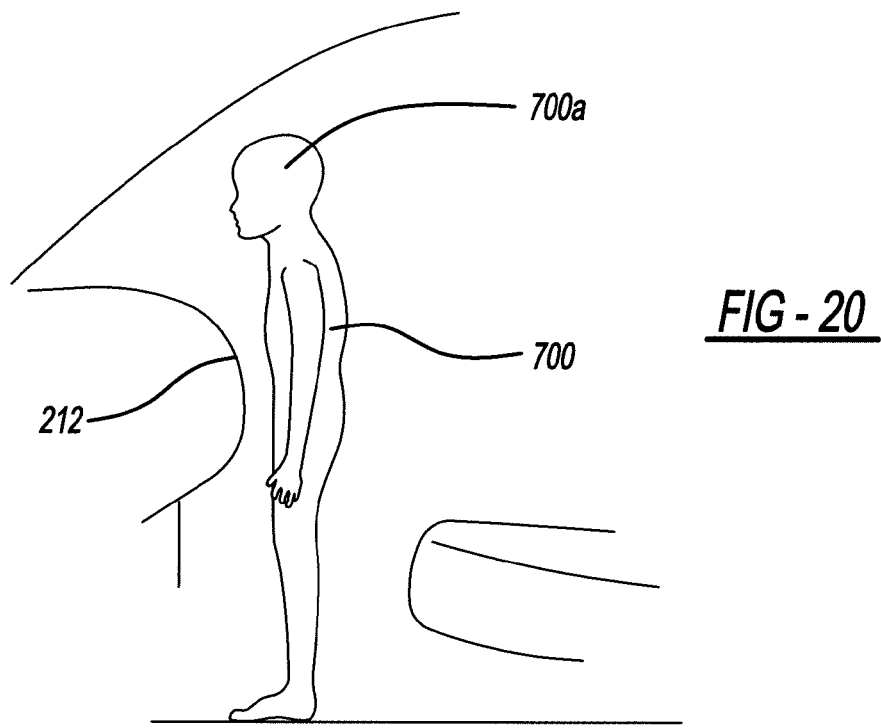
FIG. 20 is a schematic side view of a 3 year-old Anthropomorphic Test Device in Position-1 for Out of Position testing under FMVSS Standard No. 208, prior to activation of a vehicle airbag.

In particular embodiments of the airbag, it is desired to position the opening(s) 200 along the divider 100 so that, during inflation, the airbag 10 reacts with a child passenger in a predetermined manner. More specifically, the opening(s) 200 are positioned along the divider such that, as the upper chamber fills in the initial stage of deployment, the bag upper chamber 102 inflates above the top of the head 700a of a Hybrid III 3 and 6-Year Old Anthropomorphic Test Device (ATD) (generally designated 700) when the head is positioned resting against or proximate the vehicle instrument panel at a location specified as Position-2 for Out of Position (OOP) testing in accordance with FMVSS Standard No. 208 (which may be found, for example, at http://www.fmcsa.dot.gov/rules-regulations/administration/fmcsr/fmcsrruletext.aspx?reg=571.208), which is incorporated herein by reference in its entirety. The Hybrid III 3 and 6-Year Old test ATD has physical parameters defined by 49 CFR Part 572, herein incorporated by reference. Position-1 and Position-2 for Out of Position testing is schematically illustrated in FIG. 20 and FIG. 18, respectively, and described in sections 22.4.2 and 22.4.3 of FMVSS208, respectively, the descriptions of which are herein incorporated by reference.

As gases flow into the lower chamber 104 from the upper chamber 102, the lower chamber 104 inflates in the later stages of deployment so as to occupy a space behind and around the child's head, thereby preventing and/or mitigating harmful interactions between the airbag and the child's head. This inflation progression is shown in FIGS. 16 and 17.

Figure 16B:
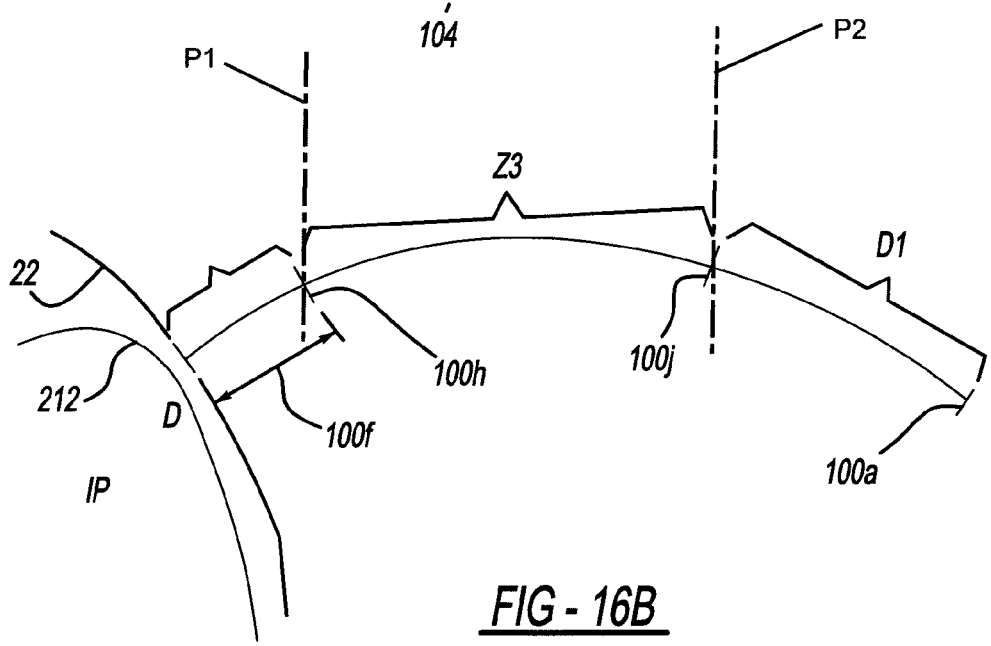
FIG. 16B is a magnified view of a portion of the cross-sectional side view shown in FIG. 16A.

The values of D1, 100f and other divider opening positioning parameters are determined as a function of the vehicle interior dimensions and the placement of the out-of-position-2 child, according to the previously-mentioned FMVSS208 standards. Practical limitations of the divider opening placement affect the airbag performance for an out-of-position 3-year old or 6-year old child, as defined by FMVSS Standard No. 208. By positioning the divider opening(s) 200 within the range defined by locations P1 and P2 (i.e., zone Z3) in FIGS. 16A and 16B, the forces exerted by the airbag on both the 3-year old and 6-year old child in Position-1 (shown in FIG. 20) will be distributed between the child's head and thorax regions. For example, it has been found that when the divider opening 200 is positioned within a distance D1 along the divider from a seam connecting the divider 100 with the occupant side of the airbag, the airbag will tend to impact the child when deployed, before completely filling. This contact with the child tends to prevent the gases from flowing into the lower chamber, which may produce greater forces acting on the child. See FIG. 21c that illustrates this configuration, for example. Also, it has been found that when the divider opening 200 is positioned within a predetermined distance 100f along the divider from an inflator side 22 of the airbag toward an occupant side of the airbag, the airbag will tend to impact the child when deployed, before completely filling, with the results previously mentioned. In contrast, referring to FIG. 21a and FIG. 21b, it has been found that when the divider opening(s) 200 is positioned within zone Z3 as previously described, the gases are permitted to flow into the lower chamber without obstruction. This creates a more evenly distributed loading on the child's head and thoracic regions. Also, with this placement of the valve 200, the gases can more easily flow out of the vents 106 from the upper chamber. As illustrated in FIG. 21b, P1 is defined by alignment with the out-of position 2 leading edge of the child's head on the instrument panel (per FMVSS208). P2 is aligned with the shoulder bolt 700b of the ATD. Z3 is of course defined as the region spanning between P1 and P2.

Figure 21A:
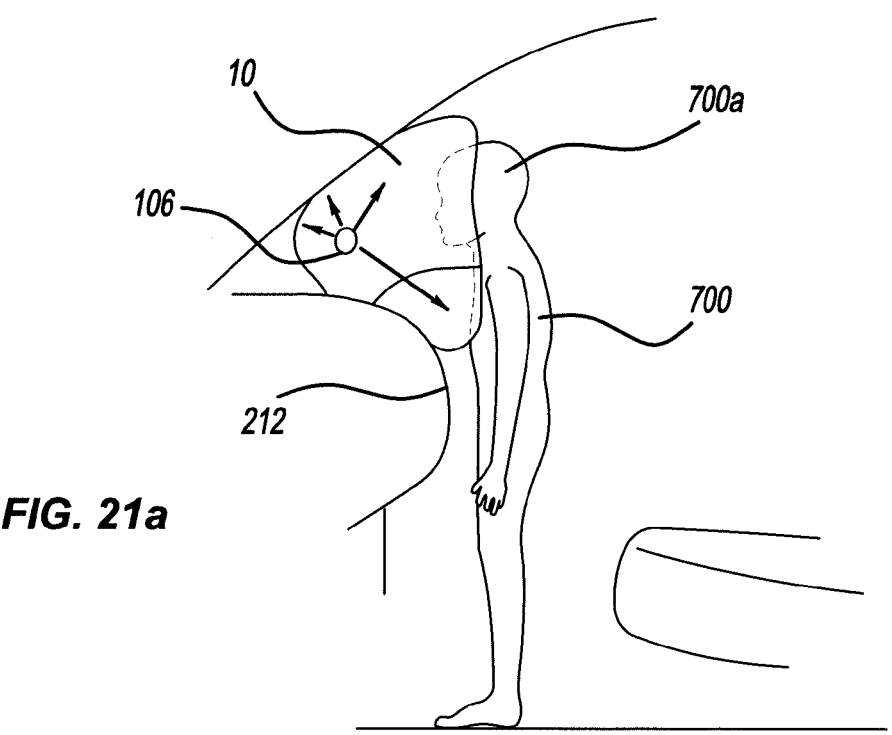
FIG. 21a is a side view of FIG. 20 after activation of a vehicle airbag.
Figure 21B:
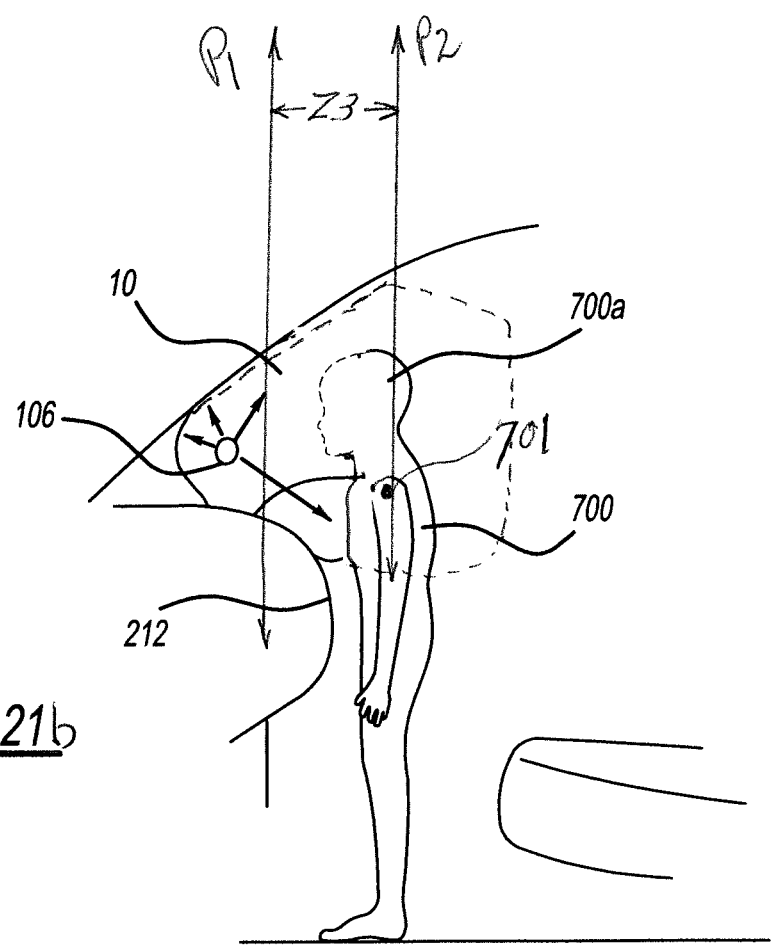
FIG. 21b is a side view of FIG. 20 after activation of a vehicle airbag illustrating the determination of zone 3, Z3, and a desired location of the valve mechanism.
Figure 21C:
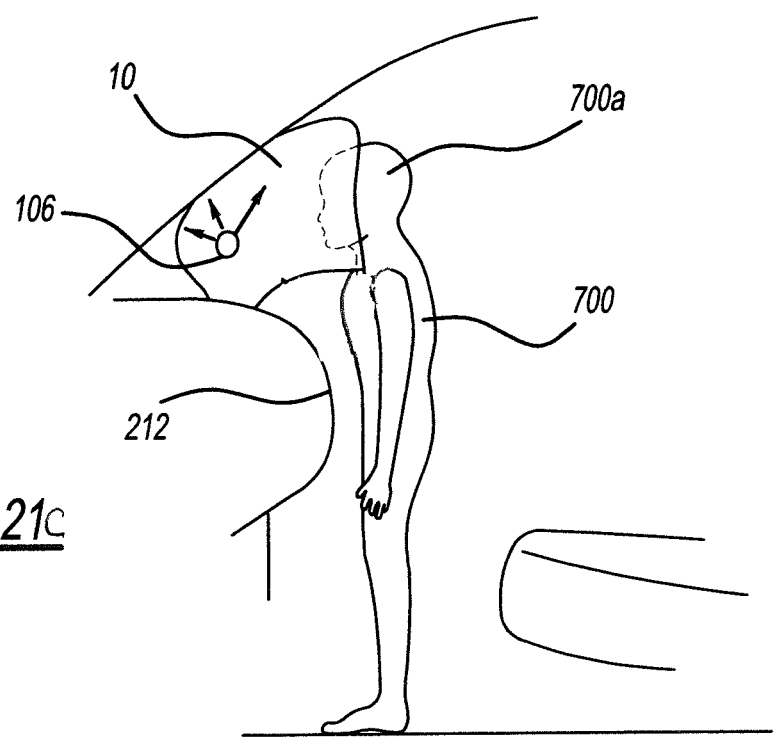
FIG. 21c is a side view of FIG. 20 after activation of a vehicle airbag illustrating the undesired location of the valve mechanism at a point rearward from the occupant or proximate the inflator.

Further to FIGS. 21a and 21b, it should be appreciated that the location(s) of the valve mechanism(s) or valve opening(s) 200 are preferably positioned within Z3 as defined in the deployed airbag. Accordingly, it will be appreciated that as described in the examples given below, the out-of-position 1 and out-of-position 2 FMVSS208 defined above are particularly important in certain embodiments with regard to placement of the opening(s) 200. It has unexpectedly been found that placement of opening(s) 200 within zone 3 or Z3 as defined herein and with reference to a deployed airbag shown in FIG. 21b for example, contributes to effectively managing and mitigating the forces acting on an out-of-position child for example, as indicated in 3-year old and 6-year old H-III ATD testing under FMVSS208. It will be appreciated that although at least one or more openings 200 should be positioned within Z3 to ensure fluid communication between the upper and lower airbag chambers with regard to airbag contact with an out-of-position child as shown in FIG. 20 (position 1 of FMVSS208), one or more openings 200 may also be positioned outside of Z3 depending on other design criteria.

Stated another way, it has been found that an optimum inflation profile range and alignment with the passenger's body as shown in FIG. 4, as well as the bag inflation progression shown in FIGS. 16-17, can be achieved by positioning all divider openings 200 such that all edges of all the openings reside within the zone bounded by or residing between locations 100$h$ and 100$j$ in FIG. 16A, which may also be defined on one side by a vertical plane P1 shown in FIG. 16 corresponding to location 100$h$ in FIG. 16$b$ abutting the front-most portion of the head of the Hybrid III 6-Year Old Anthropomorphic Test Device when the head of the Hybrid III 6-year old is in Position-2 for FMVSS208 Out of Position testing as specified above, and on an opposite side by a vertical plane P2 (see FIG. 16) passing through location 100$j$ shown in FIG. 16$b$. As known in the pertinent art, an anthropomorphic test device is a human form in shape, mass and mechanical response, equipped with sensors including accelerometers, deflection sensors and other measurement devices, to simulate the performance of the human body. It is used in the assessment of injury potential in vehicle safety testing. In one embodiment, plane P2 is spaced apart approximately 7 inches from plane P1 toward a rear of the vehicle when the airbag is inflated. This effectively positions the divider opening(s) within a zone enclosing the head of the Hybrid III 6-Year Old ATD. The distance between planes P1 and P2 defines a zone Z3 in which the openings 200 may be positioned. For example, FIG. 15 is a plan view of an uninflated airbag showing an embodiment of the airbag divider 100 having a circular opening 200 positioned such that the rear-most edge of the opening resides within the specified zone Z3 when the bag is inflated.

It has also been found that a total area of the opening (or openings) 200 within a range of 700 square millimeters (achievable using, for example, one opening of approximately 15 mm radius) to 32,000 square millimeters (achievable using, for example, one opening of approximately 100 mm radius opening) is desirable for helping to ensure that airbag performance is within an optimum range. In embodiments of the present invention, which use a directional valve mechanism to facilitate inflow and restrict backflow from the lower chamber to the upper chamber as previously described, the areas of the divider opening or openings may need to be at or near an upper end of this range of opening sizes 700 to 32,000 square millimeters, to provide the necessary inflation profile given the reduction in flow caused by turbulence and friction in the gases as they flow through the opening(s) and interact with the portions of the valve.

In one embodiment, the opening or openings 200 are circular. However, the opening(s) can have any desired shape, as long as the total area of the opening(s) is within the range specified above, and as long as all of the opening edges are positioned within the zone defined above.

In addition, the number of openings 200 and the optimum size(s) of the opening(s) formed in divider 100 for a particular application may be determined based on the type of vehicle collision pulse and interior geometry of the vehicle in which the airbag is installed, the desired fill rate of the airbag, the volume ratio, the type of directional valve used, the overall dimensions and curvature of the instrument panel, and other pertinent factors. The size(s) and position(s) of the opening(s) 200 as described herein facilitate smooth and rapid transfer of inflation gases from the upper chamber to the lower chamber during initial stages of airbag filling. Once equilibrium is substantially reached between the upper and lower chamber pressures, flow from one chamber to the other is reduced. As the occupant begins to load the lower chamber of the cushion, the pressure within the lower chamber increases, causing the operating member of the valve to restrict the backflow of gas from the lower chamber to the upper chamber. This restricted flow now is effectively absorbing energy from the occupant interaction with the bag lower chamber. The flow restriction can also be adjusted or tuned in order to absorb the occupant energy as required for a particular application. The directional valve 312 controlling flow between the upper and lower chambers can have a single operating member which provides both a desired inflow (to the lower chamber) and a desired backflow (back from the lower chamber) characteristic, or the valve can have one operating member for controlling inflow and another operating member to control outflow from the lower chamber. In the later phases of the occupant loading of the cushion, backflow from the lower chamber goes into the upper chamber and then the gas is discharged from the upper chamber into the environment through the main vents (not shown) located in the wall of the upper chamber.

In an embodiment where multiple valves are incorporated into or coupled to divider 100 to increase gas flow into lower chamber 104, all of the valves need not be positioned within zone Z3. However, it is desirable to position any additional valves within zone Z3 rather than within the distance D1 from divider leading edge 100$a$.

In the case of an Out of Position child in accordance with the FMVSS208 Position-2 testing standard, the initial stages of the cushion deployment development remains the same as described above. However, the gas flow between the upper and lower chambers as regulated by the divider valve mechanism is different when a child interacts with the cushion. In the case of the Out of Position-2 child, the volume of the lower chamber is decreased due to the space occupied by the Out of Position Child. The divider valve mechanism continues to permit the flow of gases from the upper chamber into the lower chamber. However, the valve mechanism also allows the gas to continue to flow into the lower chamber until the cushion's lower chamber and upper chamber internal pressures are in equilibrium, thereby stabilizing the interaction between the cushion and the out of position child. The divider valve mechanism 112 and cushion main vent designs are structured to facilitate rapid transition of this state of equilibrium into an adaptive state, wherein the cushion changes from a state of gas flow into the lower chamber to a state where the gas flow is increased out of the main vents (located in wall(s) of the upper chamber) into the environment. This increased flow out of the cushion allows for decreased pressure within the upper chamber and then allows for the backflow of gases from the lower chamber back into the upper chamber and out of the main vents into the environment. This adaptability of the valve mechanism 112 to regulate the flow communication between the two chambers is important for the protection of adult and child occupants.

Example 1

Locating the Valve Mechanism(s)

A passenger-side airbag of an occupant protection system is formed by iteratively considering the design variables P1, P2, D1, $L_d$, $L_a$, and Z3 in view of the specific interior of an automotive vehicle associated with the occupant protection system. The following steps are taken:

1. Obtain a vehicle occupant seating drawing defining a centerline of normally-seated H-III adult male 50 percentile (AM50) and H-III adult female 5 percentile (AF05) ATDs.
2. Begin defining the airbag/cushion profile by placing a fully chambered or deployed airbag profile in position for the normally-seated AM50 as shown in the vehicle drawing from step 1.
3. Finalize the airbag/cushion profile by confirming the airbag profile for the forward-seated AF05 to make sure the overlap with regard to the AM50 is acceptable. If desired, minor adjustments may be made with confirmation by testing vis a vis the requirements of FMVSS208. With reference to FIG. 7, position the center divider 100 within the zone Z (hip and shoulder region) defined as the thoracic region of the thoracic regions of the AM50 and the AF05 ATDs, thereby defining the protection provided for the adult occupants. Locate the leading edge 100a along Z2, that is along the hip areas of the ATDs shown in FIG. 7.
4. Next, locate P1 by using the profile of an 6-year old ATD in out-of-position 2 as per FMVSS208, Section 22. P1 will tangentially intersect the leading edge of the 6-year old ATD head as it rests upon the instrument panel.
5. Next, locate P1 by using the profile of an H-III 6-year old ATD in out-of-position 2 as per FMVSS208, Section 22. P1 will tangentially intersect the leading edge of the 6-year old ATD head as it rests upon the instrument panel.
6. Next, locate P2 by using the profile of an H-III 3-year old or H-III 6-year old ATD in position 1 as per FMVSS208, Section 22. P2 will intersect the centerline of the shoulder bolt 701 (see FIG. 21b), and extend substantially parallel to P1.
7. Next, with regard to P1 and P2, and the "filled-cushion" or deployed profile of the airbag, Z3 is established between the two planes along the divider 100.
8. Locate one or more valve(s) 200 within Z3 as defined by P1 and P2, preferably along the center of divider 100, as defined in FIG. 23 as axis L for example.
9. Adjustments may be made to the location of valve(s) 200 by varying the longitudinal and/or lateral positioning of the hole(s) 200 within Z3 and about the axis L (of FIG. 23) based on desired deployment trajectory and OOP performance.
10. Hole size adjustment may be iteratively calculated based on occupant protection requirements as determined from the crash pulse, degree of pitch, and other movements of the vehicle, these variables as understood by those of ordinary skill in the art.

An airbag and an occupant protection system for an automotive vehicle containing the airbag, wherein the airbag is made in accordance with the method given above, are also contemplated in accordance with the present invention. The passenger side airbag for each unique vehicle may therefore be designed by iteratively reconciling the requirements of FMVSS208 with the present airbag design for each vehicle.

Example 2

A passenger-side airbag was formed as per Example 1 wherein the arcuate length of $L_d$ was 22 inches and the linear length of $L_a$ was 19 inches. As such, the arcuate length of $L_d$ was about 15% greater than the linear length of $L_a$.

Example 3

A passenger-side airbag was formed as per Example 1 wherein the arcuate length of $L_d$ was 21 inches and the linear length of $L_a$ was 18 inches. As such, the arcuate length of $L_d$ was about 16% greater than the linear length of $L_a$.

Example 4

A passenger-side airbag was formed as per Example 1 wherein the arcuate length of $L_d$ was 18.5 inches and the linear length of $L_a$ was 16 inches. As such, the arcuate length of $L_d$ was about 15% greater than the linear length of $L_a$.

In particular embodiments described herein, the various airbag elements are shaped and connected to each other so that, when fully inflated, the front side 20 of the bag aids in maintaining alignment of the head, neck, and thoracic body regions along a line L as shown in FIG. 4 during early occupant interaction with the airbag, wherein the upper body portion of the occupant pivots forward from the hip point 202 along line L. As the occupant contacts the bag, it is desirable to maintain the alignment of the head and thorax regions and balance the energy absorption by the bag from the head and the thorax, to minimize the relative motion at the neck. As seen in FIG. 4, the bag is structured such that the portions of the upper and lower chambers of the cushion facing the occupant 20 form an essentially flat plane, indicated by the line P in the drawing. At the early stages of airbag inflation, the occupant seatbelt (not shown) tensions to restrain the occupant's lower thoracic region in the seat. Thus, the hip point 202 resides at a first location H1. At a later stage of inflation, as the seatbelt tensioner relaxes, thereby permitting the hip point 202 to shift from location H1 to a second location H2, closer to or lying on plane P. Thus, during the later stages of inflation, due to movement of the occupant, the line L approaches or lies along plane P.

It has been found that passenger-side airbags structured as described above are especially effective in providing optimal cushion performance for various sizes of adults and also for achieving low risk deployment performance specifications for 3 & 6 year old ATDs, as specified in the safety regulations previously mentioned. The proportioning of the pressures in the upper and lower chambers as previously described, in conjunction with the bag structure previously described, enable the airbag chamber surfaces to absorb energy responsive to interaction with both the heavier thorax and the smaller and lighter head region, so as to help maintain body alignment along line L (FIG. 4) during contact between the passenger and the airbag. Particularly from the perspective of the adult $5^{th}$ female and adult $50^{th}$ male, optimum airbag performance is provided by maintaining, to the greatest degree possible, both of these body regions in line with respect to one another, while enabling the upper body as a whole to pivot at the hip axis.

Figure 22:
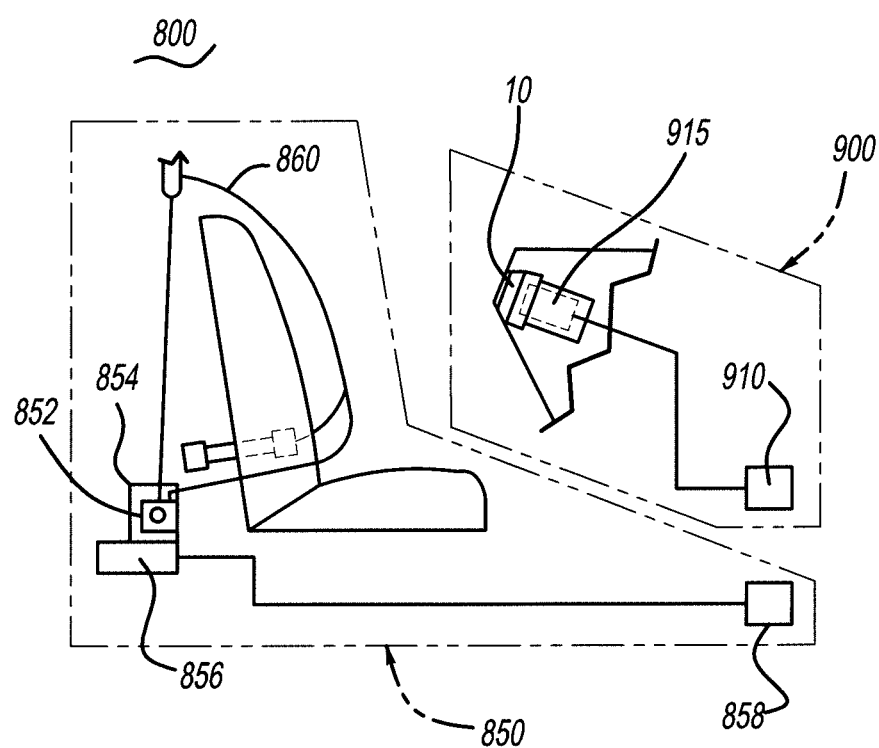
FIG. 22 is a view of a vehicle occupant protection system incorporating an airbag in accordance with an embodiment of the present invention.

Referring now to FIG. 22, an embodiment 10 of the airbag described herein may be incorporated into an airbag system 900. Airbag system 900 includes at least one gas source 915 (for example, a known inflator or gas generating system) and airbag 10 in accordance with an embodiment described herein. The airbag is operatively coupled to the gas source so as to enable fluid communication therewith upon activation of the gas generating system. Airbag system 900 may also include (or be in communication with) a collision event sensor 910. Collision event sensor 910 includes a known collision sensor algorithm that prompts actuation of airbag system 900 via, for example, activation of gas source 915 in the event of a collision.

Referring again to FIG. 22, airbag system 900 may also be incorporated into a broader, more comprehensive vehicle occupant protection system 800 including additional elements such as a safety belt assembly 850. FIG. 22 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples. It should further be emphasized that the embodiments of the present invention may contain one or more of the aforementioned inventive features described in the embodiments presented herein.

The terms "coupled," "connected," and the like as used herein means the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag, upon deployment, comprising at least one panel defining an interior of the airbag and a divider positioned in the interior so as to divide the interior into an upper chamber and a lower chamber, the divider having at least one opening formed therealong, the at least one opening being positioned such that all edges of the at least one opening reside within a zone (Z3) bounded by a first vertical plane (P1) residing a predetermined distance (100*f*) along the divider from an inflator side (22) of the airbag toward an occupant contact side of the airbag, and a second vertical plane (P2) passing through a predetermined location (100*j*) defined through a shoulder bolt of a Hybrid III 6-year old anthropomorphic test device in Position 1 defined by FMVSS208 Out of Position testing updated or verified as of Oct. 28, 2013.

2. The airbag of claim 1 wherein the first plane (P1) is in a position abutting a forward-most portion of a head of a Hybrid III 6-Year Old Anthropomorphic Test Device when the head is in Position-2 defined by said FMVSS208 Out of Position testing.

3. The airbag of claim 1 wherein the second plane (P2) is spaced apart approximately 7 inches from the first plane (P1) toward a rear of the vehicle when the airbag is fully inflated.

4. The airbag of claim 1 further comprising one or more openings formed in the divider, each one or more openings being positioned such that all edges of the one or more openings reside within the zone (Z3) bounded by the first plane (P1) and the second plane (P2).

5. The airbag of claim 4 wherein a total area of all of the openings of the plurality of openings is within the range 700 square millimeters to 32,000 square millimeters, inclusive.

6. The airbag of claim 1 wherein a total area of the at least one opening is within the range 700 square millimeters to 32,000 square millimeters, inclusive.

7. The airbag of claim 1 wherein a leading edge of the divider is attached to a front side of the airbag along a seam positioned so as to reside within a zone (Z) bounded at a lower end by a first horizontal plane positioned at a vertical distance 3.3 inches above portion of a vehicle passenger seat structured to support a hip of a passenger, and at an upper end by second horizontal plane positioned at a vertical distance 17.5 inches above the first horizontal plane.

8. A vehicle including an airbag in accordance with claim 1.

9. A vehicle occupant protection system including an airbag in accordance with claim 1.

10. An airbag for an automotive vehicle comprising:
at least one outer panel forming an airbag, the airbag having an inner wall, said airbag also having a linear length extending toward a rear position of said automotive vehicle when the airbag is fully deployed; and
a perforated divider sealed and fixed to said inner wall thereby forming an upper chamber and a lower chamber within said airbag, said divider having an arcuate length extending toward the rear of said automotive vehicle when the airbag is fully deployed, said arcuate length extending completely across said linear length,
wherein said arcuate length is at least 5% greater than said linear length.

11. The airbag of claim 10 wherein said arcuate length is at least 10% greater than said linear length.

12. The airbag of claim 10 wherein said perforated divider spans a downwardly extending arcuate section for at least a portion of said divider.

13. The airbag of claim 12 wherein said downwardly extending perforated divider creates a sub-chamber within said upper chamber when the airbag is fully deployed, said sub-chamber extending downwardly along an occupant-contact portion of the airbag.

14. A method of forming an airbag comprising the steps of:
providing a vehicle occupant seating drawing defining a centerline of normally-seated H-III adult male 50 percentile (AM50) and H-III adult female 5 percentile (AF05) anthropomorphic test devices (ATDs);
defining the airbag/cushion profile by placing a fully chambered or deployed airbag profile in position for the normally-seated AM50 as shown in the vehicle drawing;
finalizing the airbag/cushion profile by confirming the airbag profile for the forward-seated AF05 overlaps with regard to the airbag profile AM50;
positioning a divider within a predetermined zone Z that defines the hip, shoulder, and thoracic regions of the AM50 and the AF05 ATDs to form an upper chamber and a lower chamber within the airbag;
locating a leading edge of the occupant side of the airbag defined by a divider panel seam along a predetermined zone Z2, that is oriented along the hip areas of the ATDs;
defining a first plane P1 by using the leading edge of the head of an H-III 6-year old ATD in out-of-position 2 defined by FMVSS208, section 22 as updated or verified as of Oct. 28, 2013, wherein P1 tangentially intersects the leading edge of the 6-year old ATD head as it rests upon the instrument panel;
defining a second plane P2 by using the profile of an H-III 3-year old or H-III 6-year old ATD in out-of-position 1 as defined by FMVSS208, section 22 wherein P2 intersects the centerline of a shoulder bolt of the ATD, and extends substantially parallel to P1;
defining a zone Z3 between P1 and P2 within a filled cushion profile of the airbag; and
locating one or more valves on the divider and within Z3.

15. The method of claim 14 further comprising the step of:
adjusting the airbag/cushion profile relative to AM50 and AF05 ATDs, responsive to said FMVSS208 testing.

16. The method of claim 14 further comprising the step of:
iteratively adjusting the aggregate hole size of the one or more valves responsive to crash pulse, degree of pitch, and other movements of the vehicle.

17. An airbag formed by the method of claim 14.

18. An occupant protection system for an automotive vehicle containing an airbag formed by the method of claim 14.

19. The airbag of claim 17 comprising a downwardly extending divider having an arcuate length adjacent an occupant-contact side of said airbag.

20. The airbag of claim 19 comprising a sub-region in said upper chamber defined by said downwardly extending divider.

* * * * *